(12) United States Patent
Park et al.

(10) Patent No.: US 11,092,303 B2
(45) Date of Patent: Aug. 17, 2021

(54) VEHICLE LAMP AND CONTROL METHOD THEREOF

(71) Applicant: ZKW Group GmbH, Wieselburg (AT)

(72) Inventors: Jinwoo Park, Seoul (KR); Geunhyeong Kim, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 400 days.

(21) Appl. No.: 15/639,226

(22) Filed: Jun. 30, 2017

(65) Prior Publication Data

US 2018/0010755 A1     Jan. 11, 2018

(30) Foreign Application Priority Data

Jul. 6, 2016   (KR) ........................ 10-2016-0085724

(51) Int. Cl.
| | |
|---|---|
| *F21S 8/10* | (2006.01) |
| *B60Q 1/08* | (2006.01) |
| *F21S 41/147* | (2018.01) |
| *F21S 41/657* | (2018.01) |
| *F21S 41/663* | (2018.01) |
| *F21S 41/155* | (2018.01) |
| *F21Y 115/10* | (2016.01) |
| *F21S 41/143* | (2018.01) |
| *F21Y 107/70* | (2016.01) |

(52) U.S. Cl.
CPC ............ *F21S 41/147* (2018.01); *B60Q 1/085* (2013.01); *F21S 41/155* (2018.01); *F21S 41/657* (2018.01); *F21S 41/663* (2018.01); *F21S 41/143* (2018.01); *F21Y 2107/70* (2016.08); *F21Y 2115/10* (2016.08)

(58) Field of Classification Search
CPC ..... B60Q 1/085; B60Q 1/0023; F21S 41/657; F21S 41/663
See application file for complete search history.

(56) References Cited

U.S. PATENT DOCUMENTS

| | | | |
|---|---|---|---|
| 2011/0235349 A1 | 9/2011 | Nakaya et al. | |
| 2016/0221625 A1* | 8/2016 | Slaughter | H05B 45/10 |
| 2016/0332568 A1* | 11/2016 | Kim | B60Q 1/50 |

FOREIGN PATENT DOCUMENTS

| | | |
|---|---|---|
| CN | 102046420 | 5/2011 |
| CN | 103542380 | 1/2014 |
| CN | 103727473 | 4/2014 |
| CN | 103765086 | 4/2014 |

(Continued)

OTHER PUBLICATIONS

Extended European Search Report in European Application No. 17001151.4, dated Dec. 6, 2017, 7 pages (with English translation).

*Primary Examiner* — Tracie Y Green
(74) *Attorney, Agent, or Firm* — Fish & Richardson P.C.

(57) ABSTRACT

A vehicle lamp may include at least one head lamp having a plurality of optical modules spaced apart from each other. Each optical module may include a base substrate and a plurality of light emitting diodes disposed on the base substrate. The vehicle lamp may also include at least one processor configured to control the plurality of optical modules to form a light distribution pattern. The at least one processor may also be configured to control the plurality of light emitting diodes in each of the plurality of optical modules to form a respective part of the light distribution pattern.

18 Claims, 26 Drawing Sheets

(56) References Cited

FOREIGN PATENT DOCUMENTS

| | | |
|---|---|---|
| CN | 105042469 | 11/2015 |
| CN | 105377629 | 3/2016 |
| CN | 105465712 | 4/2016 |
| EP | 3020602 | 5/2016 |
| JP | 2006021633 | 1/2006 |
| JP | 2009096250 | 5/2009 |
| JP | 2013017590 | 6/2013 |
| KR | 20110013503 | 2/2011 |
| KR | 20140009923 | 1/2014 |
| KR | 20140080156 | 6/2014 |
| KR | 20160008140 | 1/2016 |
| KR | 20160077726 | 7/2016 |

* cited by examiner

1710

1730

VEHICLE LAMP AND CONTROL METHOD THEREOF

CROSS-REFERENCE TO RELATED APPLICATION

Pursuant to 35 U.S.C. § 119(a), this application claims the benefit of an earlier filing date and the right of priority to Korean Application No. 10-2016-0085724, filed on Jul. 6, 2016, the contents of which are incorporated by reference herein in its entirety.

TECHNICAL FIELD

This disclosure generally relates to a lamp provided in a vehicle, and a method for controlling the same.

BACKGROUND

Generally, a vehicle is typically provided with various types of lamps that perform various illumination functions. For example, vehicle lamps facilitate recognition of objects near the vehicle, or implement a signaling function to inform those outside the vehicle of a driving state of the vehicle.

An illumination function of a vehicle lamp is typically implemented, for example, by a head lamp or a fog lamp. A signaling function is typically implemented by a turn signal lamp, a tail lamp, a brake lamp, or a side marker.

The design, installation, and operation of lamps in vehicles are typically regulated by various legal, regulatory, and/or industry standards.

SUMMARY

Implementations described herein provide a vehicle lamp that is configured to adaptively generate different light distribution patterns.

In one aspect, a vehicle lamp may include at least one head lamp having a plurality of optical modules spaced apart from each other. Each optical module may include a base substrate and a plurality of light emitting diodes disposed on the base substrate. The vehicle lamp may also include at least one processor configured to control the plurality of optical modules to form a light distribution pattern. The at least one processor may also be configured to control the plurality of light emitting diodes in each of the plurality of optical modules to form a respective part of the light distribution pattern.

In some implementations, the at least one processor may be configured to control the plurality of optical modules to form the light distribution pattern by: controlling, among an aggregate group of light emitting diodes in the plurality of optical modules, a first group of light emitting diodes to form a first part of the light distribution pattern, and a second group of light emitting diodes to form a second part of the light distribution pattern.

In some implementations, the at least one processor may be configured to control the first group of light emitting diodes to output a first amount of optical output for the first part of the light distribution pattern to be different from a second amount of optical output for the second part of the light distribution pattern that is output by the second group of light emitting diodes.

In some implementations, the at least one processor may be configured to control a first amount of optical output for the first part of the light distribution pattern by differently controlling a brightness of light emitting diodes in the first group of light emitting diodes.

In some implementations, the at least one processor may be configured to control a first amount of optical output of the first part of the light distribution pattern by turning off at least one light emitting diode in the first group of light emitting diodes.

In some implementations, the first group of light emitting diodes may be implemented on a base substrate of a first optical module among the plurality of optical modules, and the second group of light emitting diodes may be implemented on a base substrate of a second optical module among the plurality of optical modules.

In some implementations, the first part of the light distribution pattern formed by the first group of light emitting diodes may be included in a low beam region, and the second part of the light distribution pattern formed by the second group of light emitting diodes may be included in a high beam region.

In some implementations, the at least one processor may be configured to control the first group of light emitting diodes to form the first part of the light distribution pattern by: controlling at least some light emitting diodes in the first group of light emitting diodes to have different angles between a respective direction and a reference direction.

In some implementations, the vehicle lamp may further include a driving unit configured to change a direction of orientation for at least some light emitting diodes in the first group of light emitting diodes.

In some implementations, the at least one processor may be further configured to: among the plurality of light emitting diodes in each of the plurality of optical modules, deactivate one or more light emitting diodes that do not form the respective part of the light distribution pattern.

In some implementations, the at least one processor may be configured to control the plurality of light emitting diodes in each of the plurality of optical modules to form the respective part of the light distribution pattern by: controlling an on/off state of the plurality of light emitting diodes to form the respective part of the light distribution pattern; and changing a set of light emitting diodes that are turned off according to a change in the light distribution pattern.

In some implementations, the at least one processor may be configured to control the at least one head lamp by controlling a left head lamp to form a first partial light distribution pattern, and controlling a right head lamp to form a second partial light distribution pattern. The light distribution pattern may include the first partial light distribution pattern and the second partial light distribution pattern.

In some implementations, the at least one processor may be configured to control the left head lamp and the right head lamp to output the first and second partial light distribution patterns to not overlap with each other.

In some implementations, the at least one processor may be configured to: based on one of the right head lamp or the left head lamp being in a state of malfunction, control at least some of the optical modules included in the other of the right head lamp or the left head lamp to output an extended partial light distribution pattern.

In some implementations, the at least one processor may be configured to control the right head lamp and the left head lamp to output the first and second partial light distribution patterns to overlap with each other at least partially.

In some implementations, the at least one processor may be configured to control a first brightness of a first set of light emitting diodes that correspond to an overlapped portion between the first and second partial light distribution patterns to be different from a second brightness of a second set of light emitting diodes that correspond to a non-overlapped portion between the first and second partial light distribution patterns. The at least one processor may be configured to control the first brightness and the second brightness such that an amount of optical output for the light distribution pattern that comprises the first and second partial light distribution patterns is maintained at a constant value.

In some implementations, each optical module in the left head lamp may form a different respective part of the first partial light distribution pattern, and each optical module included in the right head lamp may form a different respective part of the second partial light distribution pattern.

In some implementations, each of the plurality of optical modules may include an electrode layer that is disposed on the base substrate and that is electrically connected to the plurality of light emitting diodes. The electrode layer may be provided with a common electrode surface with which each of the plurality of light emitting diodes is overlapped.

In some implementations, the at least one processor may be further configured to control a current applied to the plurality of light emitting diodes in each of the plurality of optical modules, such that the light distribution pattern is formed.

In some implementations, at least part of the common electrode surface may be configured to be bent.

Further scope of applicability of the present disclosure will become more apparent from the detailed description given hereinafter. However, it should be understood that the detailed description and specific examples are given by way of illustration only, and various changes and modifications may be made.

DETAILED DESCRIPTION

Figure 1:
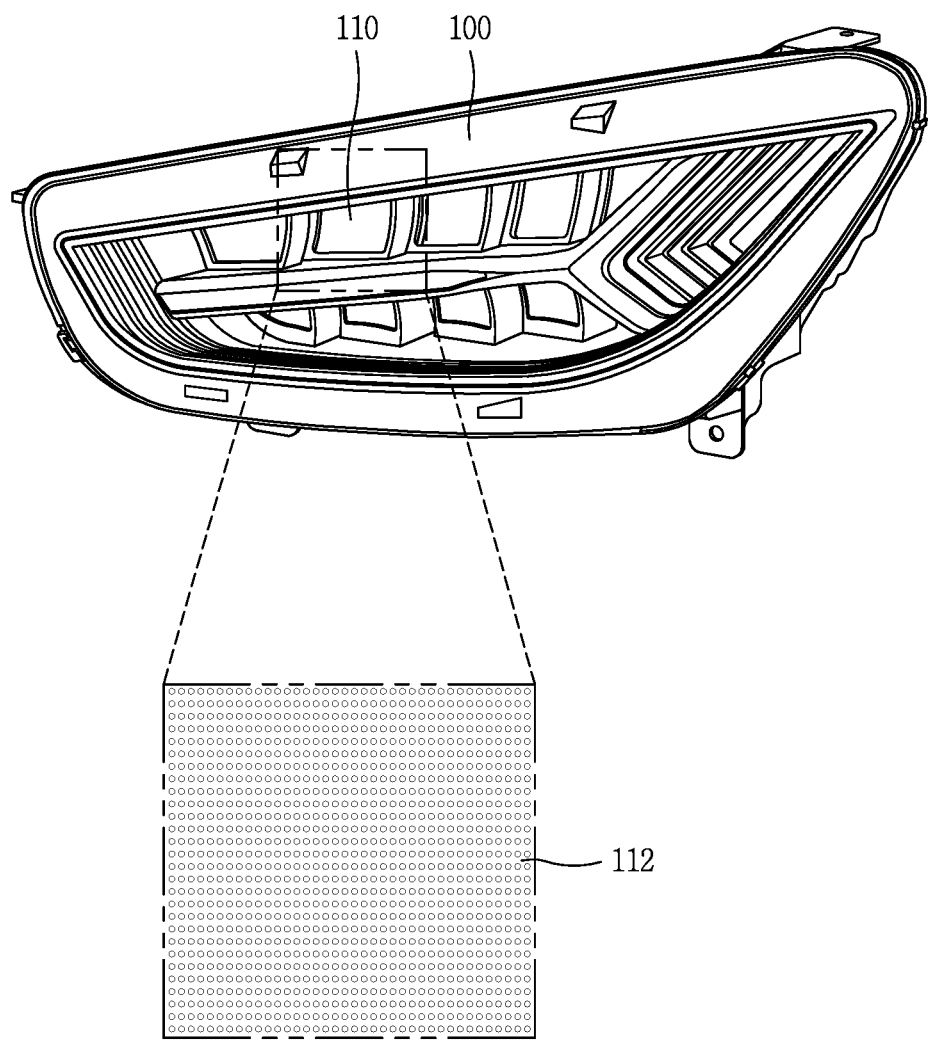
FIG. 1 is a diagram illustrating an example of a vehicle lamp according to some implementations.

Implementations described herein provide a vehicle lamp configured to adaptively output different light distribution patterns through a simplified configuration. In some implementations, the vehicle lamp may be configured to generate light distribution patterns having a cut-off line, and may be configured to adaptively move the cut-off line using a fixed state of optical modules.

A vehicle lamp may form a beam pattern having a predetermined cut-off line according to various purposes. For instance, a head lamp may irradiate high beams to a distant region to facilitate a long-distance view, and irradiate low beams to a local area around the vehicle to mitigate glare for oncoming vehicles. To implement such operations, as an example in case of a low beam, the head lamp may be configured to irradiate the low-beam light only to a region below a cut-off line so as to mitigate glare for other vehicles located at a front side of the vehicle.

The vehicle lamp may adaptively output the different illumination patterns having a high resolution and control an amount of illumination to satisfy certain conditions (e.g., legal, regulatory, or industry standards).

In some implementations, a vehicle may implement an adaptive front lighting system that changes a light distribution pattern according to a driving state of a vehicle. For example, a head lamp may be controlled to output a light distribution pattern that adaptively changes according to a driving speed, a driving direction, a road state, a peripheral brightness, or other driving states of the vehicle.

In some implementations, the adaptive front lighting system may be configured to adaptively change a light distribution pattern for a low beam and/or a high beam. For instance, in case of low beams, a light distribution pattern may be changed based on driving information of a vehicle. In case of high beams, a light distribution pattern may be changed in an adaptive manner, e.g., according to an object positioned at a front side of the vehicle, such as another oncoming vehicle.

As an example of adaptively forming different light distribution patterns, light that is emitted from a light source may be partially shielded, for example by a shield or mask, to generate different light output patterns. In such scenarios, the shield may be controlled to adaptively control a shield direction, a shield degree, etc., of the light. However, such scenarios are limited due to a limited structure of such shields. For example, a shield may only be able to generate a limited number and type of light distribution patterns, and implementing such shields may increase complexity of the vehicle lamp, and increase fabrication costs.

According to implementations described herein, a vehicle lamp is provided that has a simplified structure and that is configured to more easily generate various light distribution patterns.

In some implementations, the vehicle lamp may be configured to control pixels individually to generate different light distribution patterns. As such, by adaptively controlling the on/off state of individual pixels, additional structures to form a light distribution pattern may not be required. Accordingly, the vehicle lamp may have a simplified structure, resulting in reduction of space occupied by the vehicle lamp in a vehicle, and reduction of fabrication costs.

Further, the optical modules implemented in the vehicle lamp may be fabricated by the same process and may be installed in the vehicle lamp according to a desired optical output amount. As such, the vehicle lamp may be configured to output a sufficient amount of light through a simple configuration, and generate various light distribution patterns.

The vehicle lamp may be configured to adaptively move a cut-off line in the light distribution patterns using a fixed state of the optical modules by controlling an on/off state of light emitting diodes included in a display light source. As such, the vehicle lamp may not necessarily require a motor or other mechanism for aiming the vehicle lamp, and the vehicle lamp may thus be implemented in a reduced and simplified configuration.

According to implementations described herein, the adaptive operability and functionality of the vehicle lamp may enable the vehicle lamp to be developed using a single common specification. As such, fabrication costs may be reduced, and the vehicle lamp may be utilized in various countries and under various legal and regulatory standards without necessarily changing the physical configuration of the vehicle lamp.

A vehicle lamp of the present disclosure may include, as examples, a headlight (a head lamp), a tail lamp, a sidelight, a fog lamp, a turn signal lamp, a brake lamp, an emergency lamp, a backup light (a tail lamp), etc. However, implementations are not limited thereto, and the examples and configurations of the present disclosure may be applicable to various types of light projection devices utilized in a vehicle.

Various implementations described herein may be implemented in a computer-readable medium, a machine-readable medium, or similar medium using, for example, software, hardware, or any combination thereof.

The present disclosure will describe a vehicle lamp as a head lamp configured to facilitate a front view of a vehicle. However, the vehicle lamp of the present disclosure may be implemented as various lamps installed in a vehicle, such as a fog lamp, a tail lamp, a brake lamp, a position lamp, or a turn signal lamp, just to name a few examples.

A vehicle may be provided with various vehicle lamps having an illumination function or a signal function. For example, a halogen lamp or a gas discharge lamp may be implemented in some lamps. As another example, a light emitting diode (LED) may be implemented as a light source.

LEDs may have several advantages including reduced size and improved economic efficiency owing to a longer lifespan. Although some LEDs are manufactured in the form of a package, in some scenarios an LED is not manufactured in the form of a package, and instead is developed as a semiconductor light emitting diode which converts a current into light to operate as a light source to display electronic devices as well as information technology equipment.

However, typical vehicle lamps tend to suffer from a low mass production yield because of implementing LEDs that are manufactured in the form of a package, resulting in high fabrication cost and low flexibility. Further, vehicle lamps implementing LEDs suffer from additional disadvantages, for example, in being unable to generate sufficient optical output amounts, e.g., to satisfy legal or regulatory standards.

In some scenarios, vehicle lamps utilize a flexible surface light source implementing semiconductor light emitting diodes that are not necessarily formed in a package. However, such flexible surface light sources suffer from a problem in being unable to generate sufficient optical output amounts, e.g., to satisfy legal or regulatory standards.

According to implementations described herein, a vehicle lamp may be provided that utilizes standardized optical modules, that facilitates easy assembly processes, and that generates sufficient optical output.

Hereinafter, a structure of the vehicle lamp will be explained with reference to FIGS. 1 and 2A to 2C.

FIG. 1 is an example of a vehicle lamp according to some implementations.

The vehicle lamp 100 of the present disclosure may be formed of one or more head lamps. For instance, a vehicle may be provided with a left head lamp and a right head lamp. In this case, the vehicle lamp may be defined as a single assembly including both the left and right head lamps, or may be defined as each of the left head lamp and the right head lamp.

A head lamp may include a plurality of optical modules 110, which may be spaced apart from each other. Each of the optical modules 110 may include the same or similar components disposed in the same or similar manner, such that the optical modules 110 may be easily mass-produced.

Each of the optical modules 110 includes a light source unit 112. The light source unit 112 may include a base substrate and also include a plurality of light emitting diodes disposed on the base substrate. The base substrate may be formed as a single surface, and the plurality of light emitting diodes may be disposed on the base substrate.

In some implementations, each optical module 110 may be configured such that the plurality of light emitting diodes are disposed on the base substrate in the form of an array. For instance, the plurality of light emitting diodes may be disposed on the base substrate in the form of matrices, in rows and columns. Alternatively, the plurality of light emitting diodes may be disposed on the base substrate in an irregular pattern, or any suitable pattern. In general, each optical module 110 may be configured with a plurality of light-emitting diodes in any suitable configuration on a base substrate.

For each optical module 110, one or more light emitting diodes in the light source 112 may constitute one or more unit pixels. The light emitting diodes may be turned on and off in units of pixels and/or may have a brightness thereof controlled, e.g., under control of at least one processor such as a controller. As such, each optical module 110 may be individually controlled to generate different outputs of light by controlling the brightness or activation state of different sets of pixels corresponding to different light emitting diodes.

In some implementations, a controller may adaptively control each optical module 110 so that the light emitting diodes in the light source 112 generate different outputs. For example, the controller may control each optical module 110 so that the light emitting diodes in the light source 112 output patterns of different shapes, or to output patterns of the same shape with different brightness.

Each optical module 110 may implement the light emitting diodes in the light source 112 using any suitable semiconductor-based diode that emits light when activated. Examples of such light emitting diodes include OLEDs, LEDs, micro LEDs, or laser diodes.

As such, by controlling the brightness and/or activation state of different light emitting diodes in the light source 112, each of the optical modules 110 may be configured to generate a particular light distribution pattern or image. For example, in a case where optical modules are disposed in a head lamp, 't' light distribution patterns are generated from the head lamp.

The light distribution patterns that are output by the optical modules 110 may represent patterns or images that would be generated, for example, when the light is irradiated onto a screen at a distance from the light source 112. For example, the light distribution pattern may represent a pattern that would be irradiated onto a screen by the optical module 110 arranged at a predetermined height and predetermined angle.

For example, in a state where the optical modules 110 are optical modules are arranged in the head lamp 100, if all light emitting diodes provided at the 't' optical modules are turned on, then an image or pattern of a largest possible size which can be formed by the head lamp would be displayed on a screen. The image or pattern of a largest possible size which can be formed by the head lamp will be referred to as "a displayable region" of the head lamp. As such, the "displayable region" is the largest possible image or pattern that can be displayed by jointly activating all of the optical modules 110 in the head lamp 100 simultaneously.

Therefore, each individual optical module 110 forms only part of the overall displayable region, i.e., only a partial segment of the overall largest possible light distribution pattern. However, the partial segment of the light distribution pattern generated by a single optical module 110 may have insufficient brightness or illumination to satisfy a required light output condition, e.g., as required by legal or regulatory standards. An example of such a scenario is illustrated below with reference to FIG. 2B.

Such problems are addressed by implementations disclosed herein by coordinating a plurality of optical modules 110 to jointly illuminate different segments of the overall light distribution pattern. In some implementations, the plurality of optical modules 110 are grouped into a plurality of groups, and optical modules 110 included in each group are coordinated and controlled to form the same part of the overall light distribution pattern. For example, optical modules 110 included in a first group may be controlled to form a first part of the overall light distribution pattern, and optical modules 110 included in a second group may be controlled to form a second part of the overall light distribution pattern, etc.

As such, in a scenario where a light distribution pattern generated from a single optical module 110 has a brightness of 'x', and an optical output amount required in the specific part of the light distribution pattern is '3×', the head lamp 100 may control three optical modules 110 to cooperatively illuminate the specific part of the light distribution pattern. In this example, the three optical modules 110 may each be controlled to irradiate the part of the overall light distribution pattern, resulting in a superposition of three such patterns. As the three light distribution patterns are irradiated, the required optical amount of '3×' may be obtained for that part of the overall light distribution pattern.

Each of the optical modules 110 may be arranged to have a different angle of emission (e.g., based on a common reference axis), such that the plurality of optical modules 110 included in the same group may irradiate light distribution patterns to be superimposed onto the same location, despite the different optical modules 110 being disposed at different positions on the head lamp 100. In some implementations, the head lamp 100 may further include a driving unit configured to change a direction that each optical module 110 faces, and the vehicle lamp 100 may control a direction that at least one optical module 110 faces by using the driving unit.

In some implementations, each optical module 110 may include pixels formed of 'm' columns and 'n' rows, and at least one light emitting diode may be disposed at each pixel. In some scenarios, 'm' and 'n' may be the same natural number.

In a state where the pixels are arranged in the form of matrices, if all of the light emitting diodes provided in the optical module 110 are simultaneously activated, then a light distribution pattern may be formed as a matrix shape. For instance, if the matrices of pixels have a square shape, then a resulting light distribution pattern also has a square shape. However, implementations of optical modules 110 disclosed herein are not limited to the square shape of pixels. That is, the light distribution pattern may have various shapes according to an arranged state of the pixels in each optical module 110.

According to an on/off state of the pixels, a shape of the light distribution pattern generated by the optical module 110 may be changed. By controlling the activation of different pixels, the optical modules 110 may generate, for example, characters or symbols, as well as a light distribution patterns of various shapes such as a triangle, a polygon, or a circle.

If the optical modules 110 that are included in the same group generate light distribution patterns having the same shape and superimposed on each other, then a required optical output amount may be obtained and a light distribution pattern suitable for a given situation may be generated.

Light emitting diodes of optical modules 110 included in the same group may be classified into a first sub-group which forms a low beam region, and a second sub-group which forms a high beam region. If all optical modules 110 included in a first group are activated, then light distribution patterns may generate both high beams and low beams. If only light emitting diodes included in the first sub-group are activated, then light distribution patterns may generate low beams, and if only light emitting diodes included in the second sub-group are activated, then light distribution patterns may generate high beams. As such, high beams and low beams may be selectively generated by a single light emitting optical module 110.

Hereinafter, the aforementioned optical module 110 and a vehicle having the same will be explained in more detail.

Figure 2A:
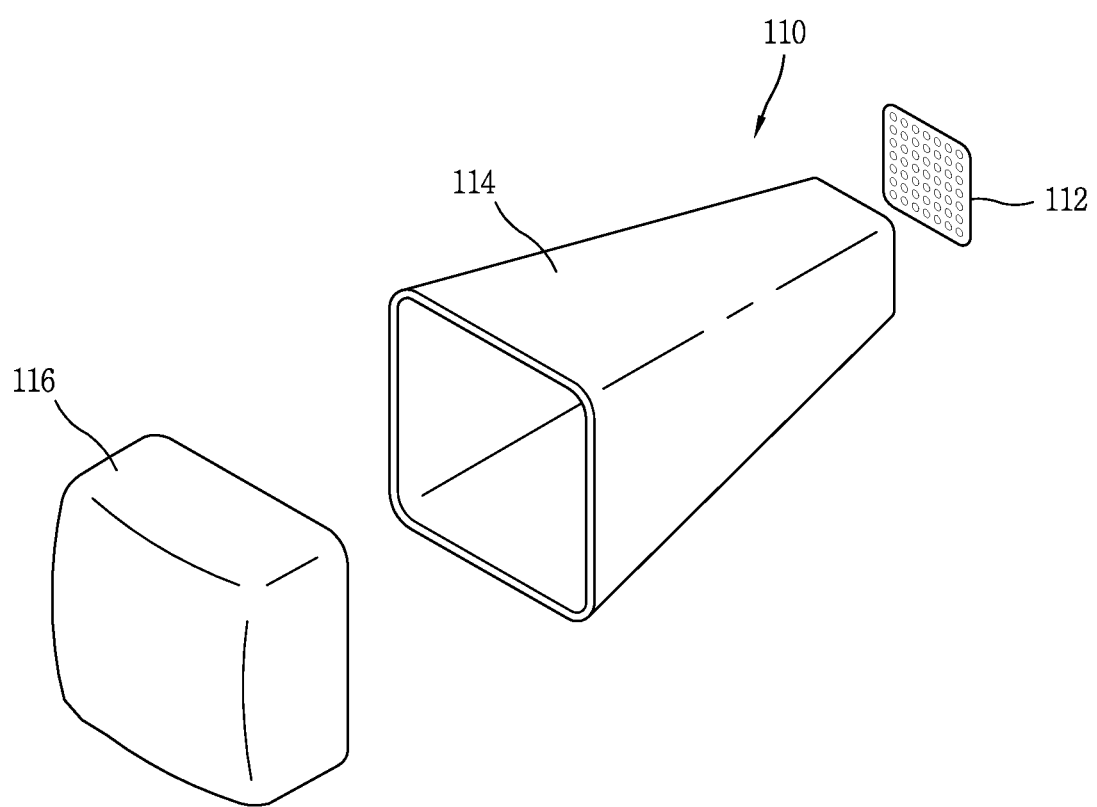
FIG. 2A is a diagram illustrating an example of an optical module provided at the vehicle lamp shown in FIG. 1.

FIG. 2A is an example of an implementation of the optical module 110 provided in a vehicle lamp as shown in FIG. 1.

In this example, the optical module 110 includes a lens 116, a tunnel 114, and a light source unit 112.

The light source unit 112 is a light emitting module that generates light and may be, for example, a projection type. In some scenarios, a projection-type light source may be more advantageous than a general clear-type light source in terms of a light distribution effect in collecting light into a single point. Further, in some scenarios, a projection-type light source may have other functional and/or aesthetic advantages. In some implementations, the light source unit 112 may be composed of a discharge bulb, and a light emitting portion which emits light by the discharge bulb. The discharge bulb may be a metal halide bulb, for instance.

The light source unit 112 may include a plurality of light emitting diodes disposed on a single base substrate. The plurality of light emitting diodes of the light source unit 112 may be individually turned on/off, and each diode may output light of a different brightness when turned on. As such, the optical module 110 may output an image of a different shape by controlling the plurality of light emitting diodes.

Hereinafter, the light source which can output an image of a different shape will be referred to as displayable light source, i.e., 'display light source'.

The tunnel 114 is configured to guide light generated from the light source unit 112 to one opening. For example, the tunnel 114 may guide light that is emitted from the light source unit 112 toward a desired position by utilizing reflection. In some implementations, the light emitted from the light source unit 112 may be directly transmitted to the opening of the tunnel 114, without being reflected by the tunnel 114.

The light source unit 112 may be provided at the tunnel 114 on an opposite side ('light incidence portion') to the opening ('light emission portion'). The light source unit 112 may be provided inside or outside the tunnel 114. If the light source unit 112 is provided outside the tunnel 114, the light incidence portion may be also implemented in the form of the opening, or the light incidence portion may be partially or entirely blocked by a light transmittance material.

The lens 116 may be configured to project light that is emitted from the light emission portion, i.e., the opening of the tunnel 114. The lens 116 may be configured to transmit light that is emitted from the light source unit 112 in a forward direction by utilizing refraction. For example, the lens 116 may have a focal point in the form of a convex lens or a concave lens.

The example of FIG. 2A illustrates the tunnel 114 having a quadrangular pyramid shape, and the lens 116 contacting the light emission portion also having a quadrangular sectional shape. However, this is merely an example, and the tunnel 114 and/or the lens 116 may have any suitable shape. For example, the tunnel 114 may have a conical shape, as well as a poly-pyramid shape such as a triangular pyramid shape or a pentagonal pyramid shape.

Figure 2B:
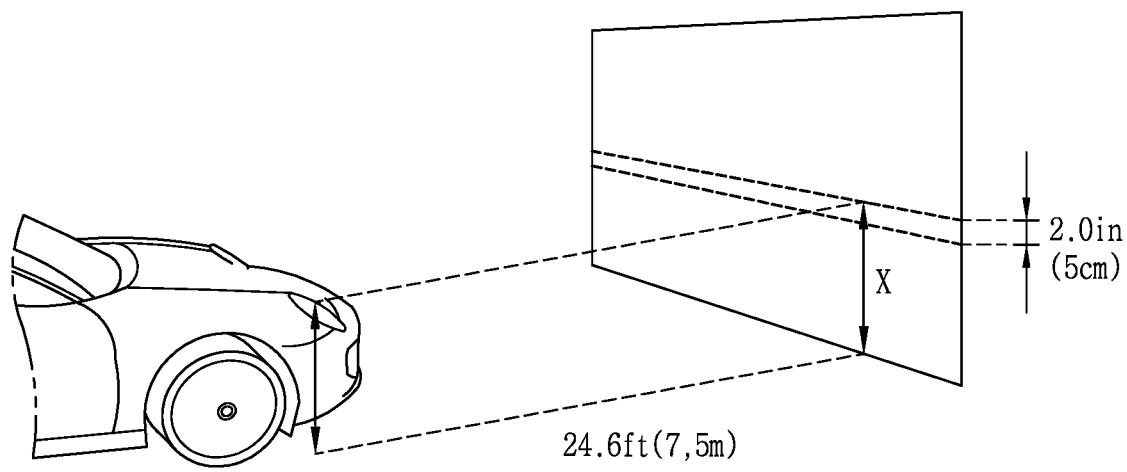
FIG. 2B is a diagram illustrating an example of a partial light distribution pattern generated by the optical module shown in FIG. 2A.
Figure 2B:
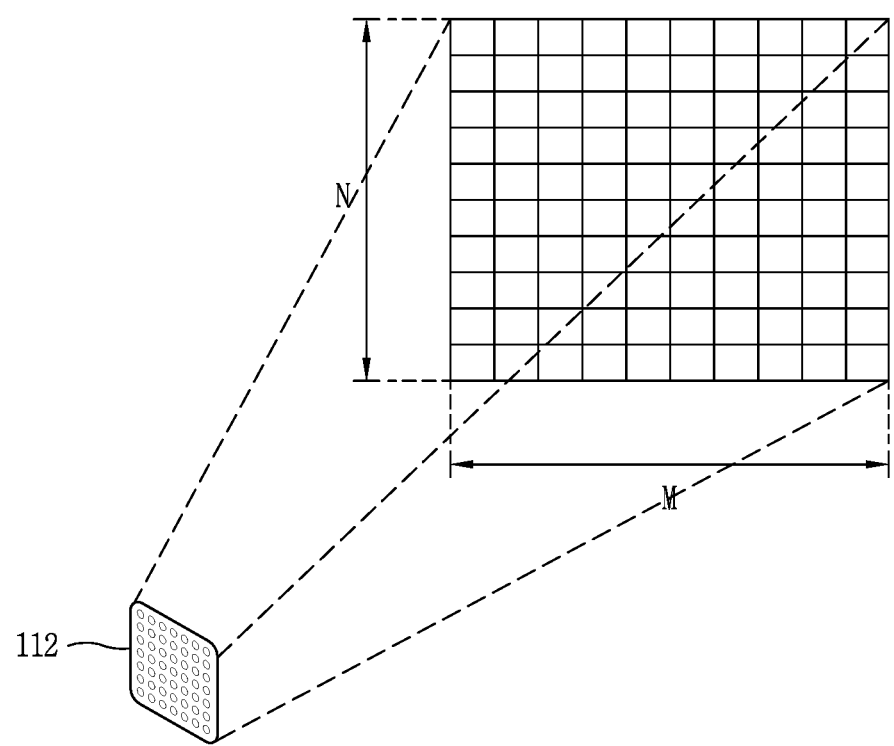

FIG. 2B illustrates a partial light distribution pattern generated by the optical module 110 shown in FIG. 2A.

Each of a plurality of optical modules 110 included in the vehicle lamp 100 forms a partial light distribution pattern, and a plurality of partial light distribution patterns are superimposed to form a single entire light distribution pattern.

The light distribution pattern refers to a spatial distribution of a lighting generated by a light source. The light distribution pattern may represent an image that would be formed on a screen (e.g., a wall surface) by the vehicle lamp. That is, the light distribution pattern may be defined as an image that would be formed on a screen when the vehicle lamp emits light at a position spaced from the screen by a predetermined distance.

If a single optical module 110 includes a plurality of light emitting diodes, then various partial light distribution patterns may be formed by the optical module 110. For instance, if the optical module 110 is formed of 'M×N' pixels, then various partial light distribution patterns may be formed as the light emitting diodes are activated in units of the pixels, or a brightness of the light emitting diodes is changed in units of the pixels. Here, 'M' and 'N' are natural numbers.

Figure 2C:
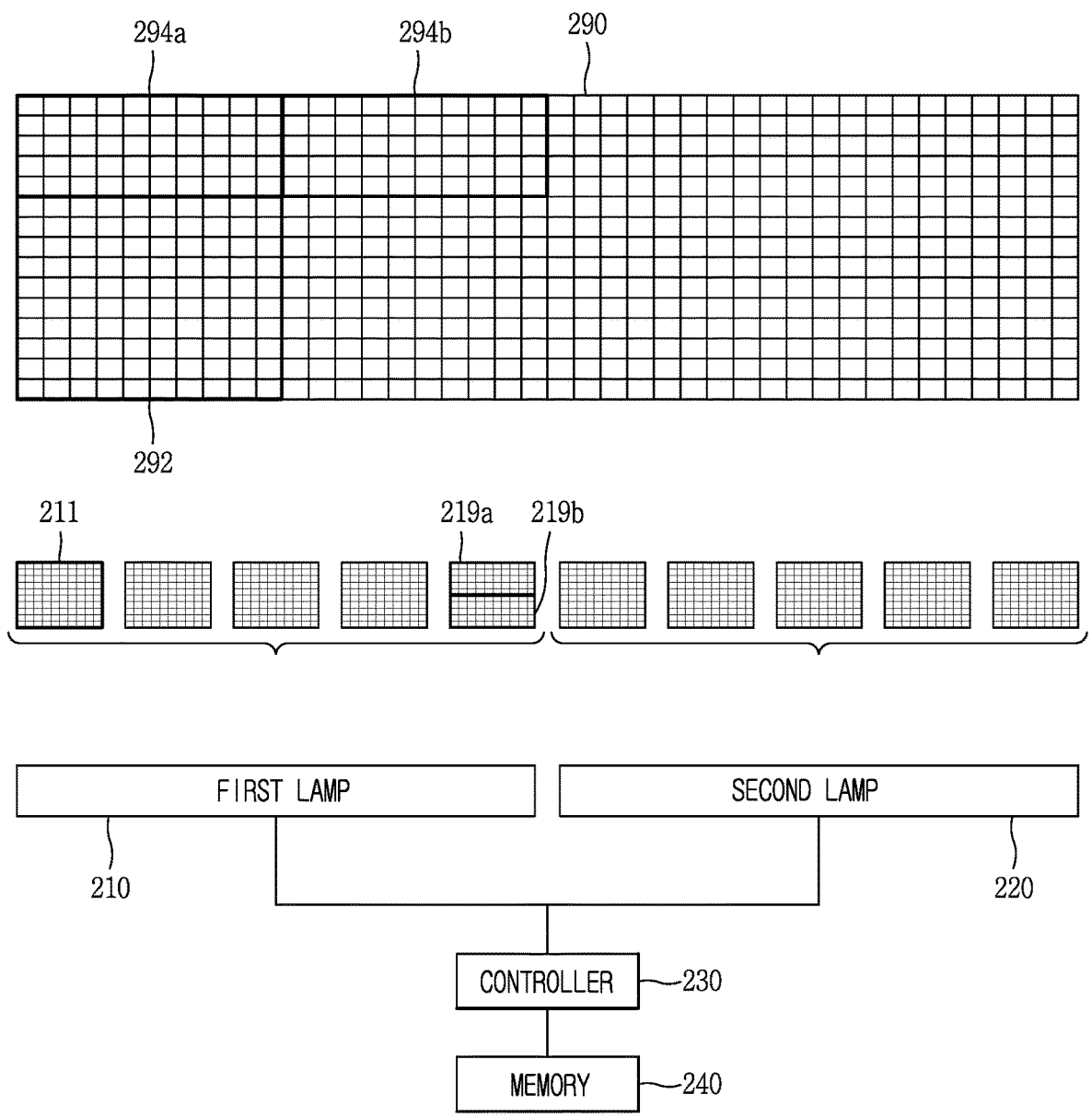
FIG. 2C is a diagram illustrating an example of an entire light distribution pattern generated by optical modules included in the vehicle lamp shown in FIG. 1.

FIG. 2C illustrates an example of an entire light distribution pattern generated by the plurality of optical modules 110 included in the vehicle lamp 100 shown in FIG. 1.

Referring to FIG. 2C, the vehicle lamp 100 may include a first lamp 210, a second lamp 220, a memory 240, and at least one processor, such as controller 230. Each of the first and second lamps 210, 220 may include a plurality of optical modules (e.g., optical modules 110 of FIG. 1). The first lamp 210 may be referred to as a first head lamp, and the second lamp 220 may be referred to as a second head lamp.

Each of the first lamp 210 and second lamp 220 may have a plurality of optical modules (e.g., a plurality of optical modules 110 of FIG. 1). Furthermore, each optical module 110 may control a particular portion of the light distribution pattern to be illuminated, or alternatively, the plurality of optical modules 110 may jointly control the entire light distribution pattern.

For example, each optical module 110 in the first and second lamps 210, 220 may control different pixels to output different types of light distribution patterns. As such, the vehicle lamp may be configured to generate different light distribution patterns via adaptive activation of pixels, rather than by implementing a physical display shield. Accordingly, the vehicle lamp 100 may have a simplified structure, a space occupied by the vehicle lamp in a vehicle may be reduced, and the fabrication cost may be reduced.

In some implementations, the control of the optical modules 110 may be controlled by an adaptive driver assistance system (e.g., an ADAS) so that the light distribution pattern is controlled based on a state of the vehicle, such as an incline of the vehicle or a geographic region. As such, the head lamp 100 may be adaptively controlled to shine different light distribution patterns of light in different locations adaptively.

Although examples described herein implement a plurality of optical modules 110 that cooperatively generate a light distribution pattern, in some implementations a single optical module 110 may be implemented. In such scenarios, the single optical module 110 may implement numerous controllable light emitting diodes, and may generate different light distribution patterns by controlling the different diodes, for example, to generate multiple superimposed segments of patterns as described to herein.

The memory 240 may be configured to store data related to various functions of the vehicle lamp 100. For example, the memory 240 may store a plurality of application programs (or applications) driven in the vehicle lamp 100, and data and commands (e.g., instruction words) for an operation of the vehicle lamp 100. At least part of the application programs may be downloaded from an external server through wireless communication. The application programs may be stored in the memory 240, and may be installed on the vehicle lamp 100 so as to execute an operation (e.g., functions) of the vehicle under control of the controller 230.

The controller 230 may control one or more functions of the vehicle lamp 100, as well as functions related to the application programs. The controller 230 may process signals, data, information, etc. input or output through the aforementioned components, or may drive the application programs stored in the memory 240, thereby providing proper information or a proper function to a user.

The controller 230 may control at least one of the first and second lamps 210, 220 based on information stored in the memory 240. For example, the memory 240 may store information about different types of overall light distribution patterns as well as information about partial light distribution patterns that comprise each overall light distribution pattern. The controller 230 may control each optical module 110 based on the information stored in the memory 240.

An overall light distribution pattern, generated when all of light emitting diodes provided at the vehicle lamp 100 are turned on, is referred to herein as a displayable region 290, as illustrated in FIG. 2C. That is, the displayable region 290 may refer to a pattern having a largest possible size which can be generated by the vehicle lamp 100.

FIG. 2C illustrates an example where the displayable region 290 has a rectangular shape. However, the shape and the size of the displayable region 290 may be changed variously according to different implementations.

Each light emitting diode corresponds to part of the displayable region 290. For example, the displayable region 290 may correspond to a plurality of pixels, and each of the pixels may correspond to one or more light emitting diodes.

A pixel may refer to one or more light emitting diodes that generates part of the overall displayable region 290.

As individual pixels are turned on and off, different light distribution patterns of the vehicle lamp 100 are generated. In this case, each optical module 110 forms a partial light distribution pattern, i.e., part of the entire light distribution pattern.

For instance, in the example of FIG. 2C, a light source unit 211 of a first optical module provided in the first lamp 210 may correspond to a first part 292 of the displayable region 290. The light source units 219a, 219b of a second optical module provided in the first lamp 210 may correspond to second parts 294a, 294b of the displayable region 290.

A different partial light distribution pattern may be formed at the first part 292 according to an operation of the first optical module, and a different partial light distribution pattern may be formed at the second parts 294a, 294b according to an operation of the second optical module.

The displayable region 290 may be partitioned into a low beam region and a high beam region based on, for example, a height from a ground surface. Light emitting diodes included in a single optical module may be grouped into diodes which output high beams, and grouped into diodes which output low beams. As such, unlike configurations that utilize different optical modules to output high and low beams, implementations disclosed herein may implement a single optical module that adaptively outputs both high beams and low beams. As such, in some scenarios, implementations disclosed herein may provide a vehicle lamp that has a simplified structure, and may reduce the fabrication cost.

Hereinafter, description will be given of generating an optical output which satisfies an output condition (e.g., an output condition according to a legal or regulatory standard) for light distribution of a vehicle by using a display light source.

The vehicle lamp includes a first lamp (e.g., a left head lamp) which forms a first partial light distribution pattern, and a second lamp (e.g., a right head lamp) which forms a second partial light distribution pattern. An entire light distribution pattern may be composed by the superposition of the first and second partial light distribution patterns.

The superposition of the first and second partial light distribution patterns may be a superposition of overlapping or non-overlapping partial patterns. As such, the entire light distribution pattern may be generated by an overlapped irradiation type in which the first and second lamps generate partial patterns in an overlapped manner, or a non-overlapped (divided) irradiation type in which the first and second lamps generate partial patterns in a non-overlapped (divided) manner.

FIGS. 3A to 3D illustrate examples of generating an entire light distribution pattern in a non-overlapped (divided) irradiation manner by the first and second lamps included in the vehicle lamp.

Figure 3A:
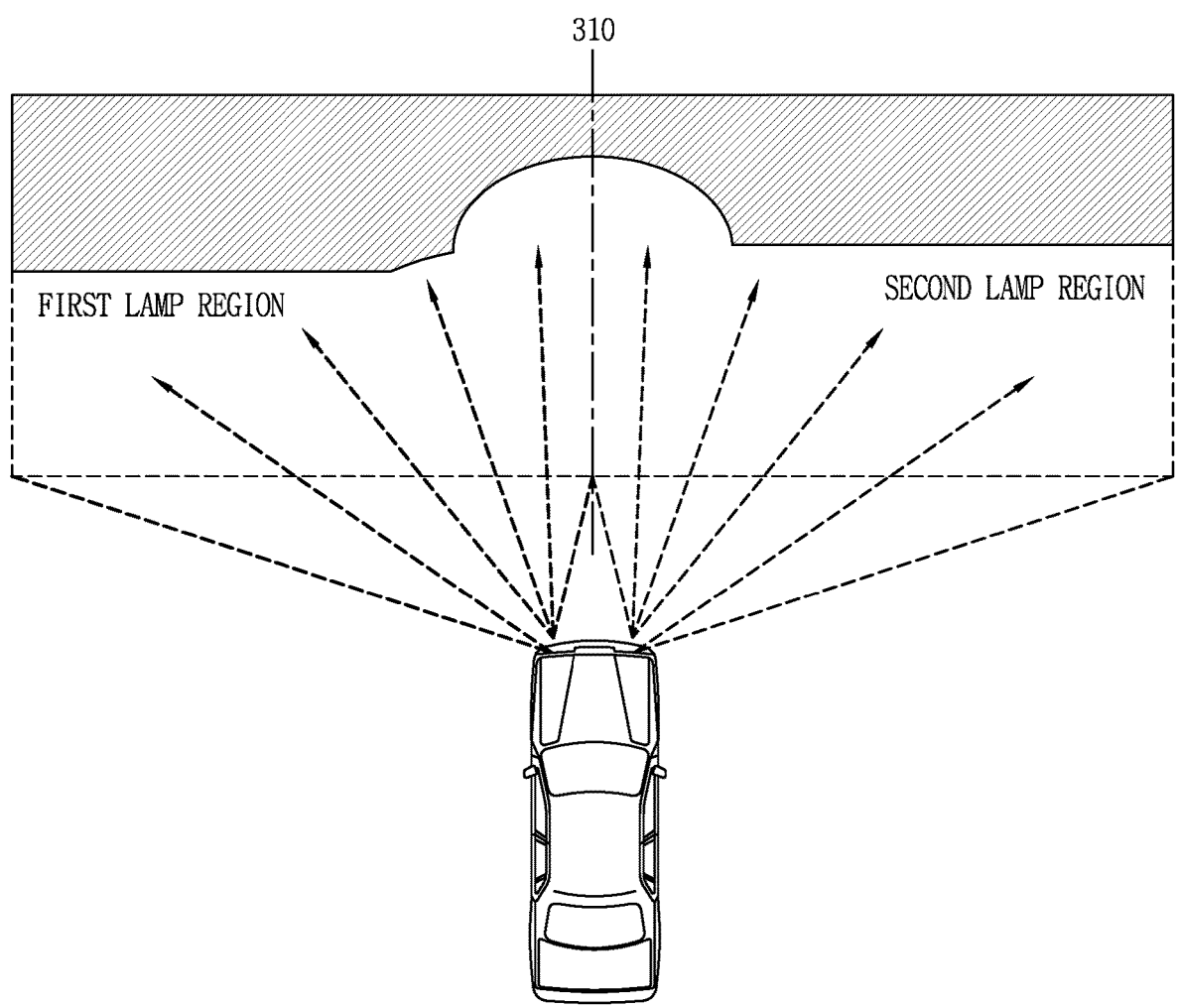
FIGS. 3A to 3D are diagrams illustrating examples of generating an entire light distribution pattern in a divided irradiation manner by first and second lamps included in the vehicle lamp.
Figure 3B:
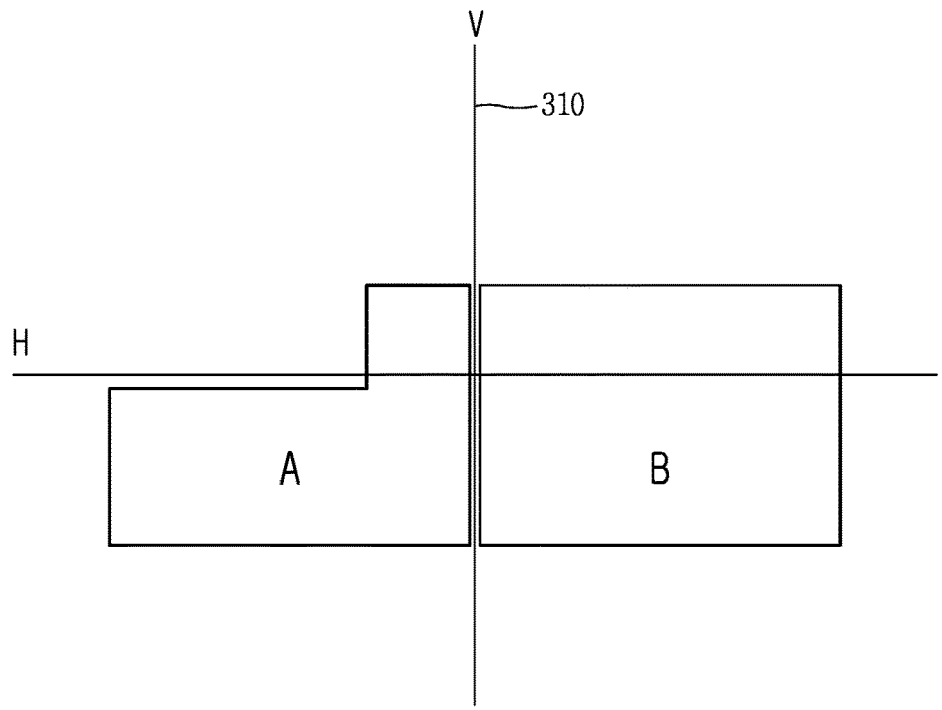

In this example of the divided irradiation manner, an entire light distribution pattern is divided into a first region (A) and a second region (B) on the basis of a reference line 310. More specifically, as shown in FIG. 3B, a first light distribution pattern formed by the first lamp 210 is output to the left side of the reference line 310, and a second light distribution pattern formed by the second lamp 220 is output to the right side of the reference line 310.

In case of the divided irradiation manner, the first and second light distribution patterns are not overlapped with each other. Each optical module included in the first lamp forms a different part of the first partial light distribution pattern, and each optical module included in the second lamp forms a different part of the second partial light distribution pattern. Accordingly, when one of the first and second lamps malfunctions, a driver may immediately recognize the malfunctioned lamp.

The reference line 310 may be adaptively moved to the left or to the right, and may be adjusted to an oblique line rather than a vertical line according to a driving situation.

Figure 3C:
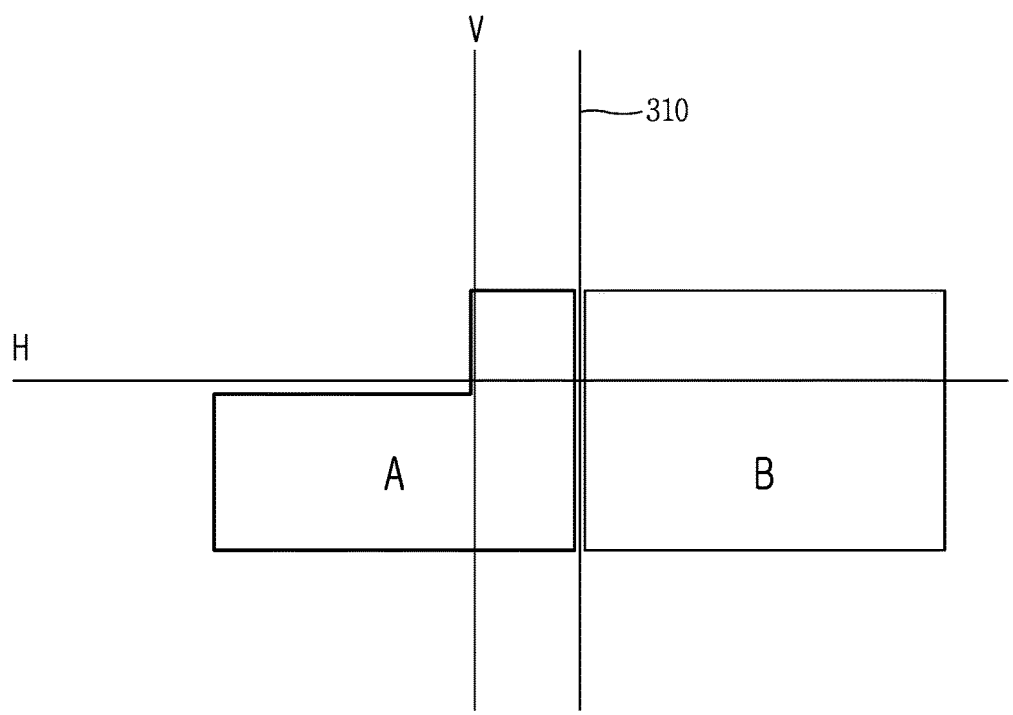

For instance, the reference line 310 may be moved based on a steering angle of a steering wheel provided at the vehicle. More specifically, the controller 230 may move the reference line 310 based on the steering angle. For instance, when the vehicle takes a right turn, a driver's eyeline is toward the right side on the basis of a driving direction. In this case, as shown in FIG. 3C, the controller may control the reference line 310 to move to the right, such that the second lamp 220 disposed on the right side may much irradiate the right side on the basis of the driving direction. The moving direction and the moving degree of the reference line 310 may be changed according to a steering angle.

Specific optical modules (e.g., optical modules 110 of FIG. 1) may irradiate light onto the same region so as to achieve sufficient optical output amount (e.g., to satisfy a legal or regulatory standard).

As an example, among the light emitting diodes included in the plurality of optical modules (e.g., optical modules 110 of FIG. 1), light emitting diodes included in a first group may form a first part of a light distribution pattern, and light emitting diodes included in a second group may form a second part of the light distribution pattern. In this case, the light emitting diodes included in the first group may be disposed on a base substrate of a different optical module among the plurality of optical modules 110.

Figure 3D:
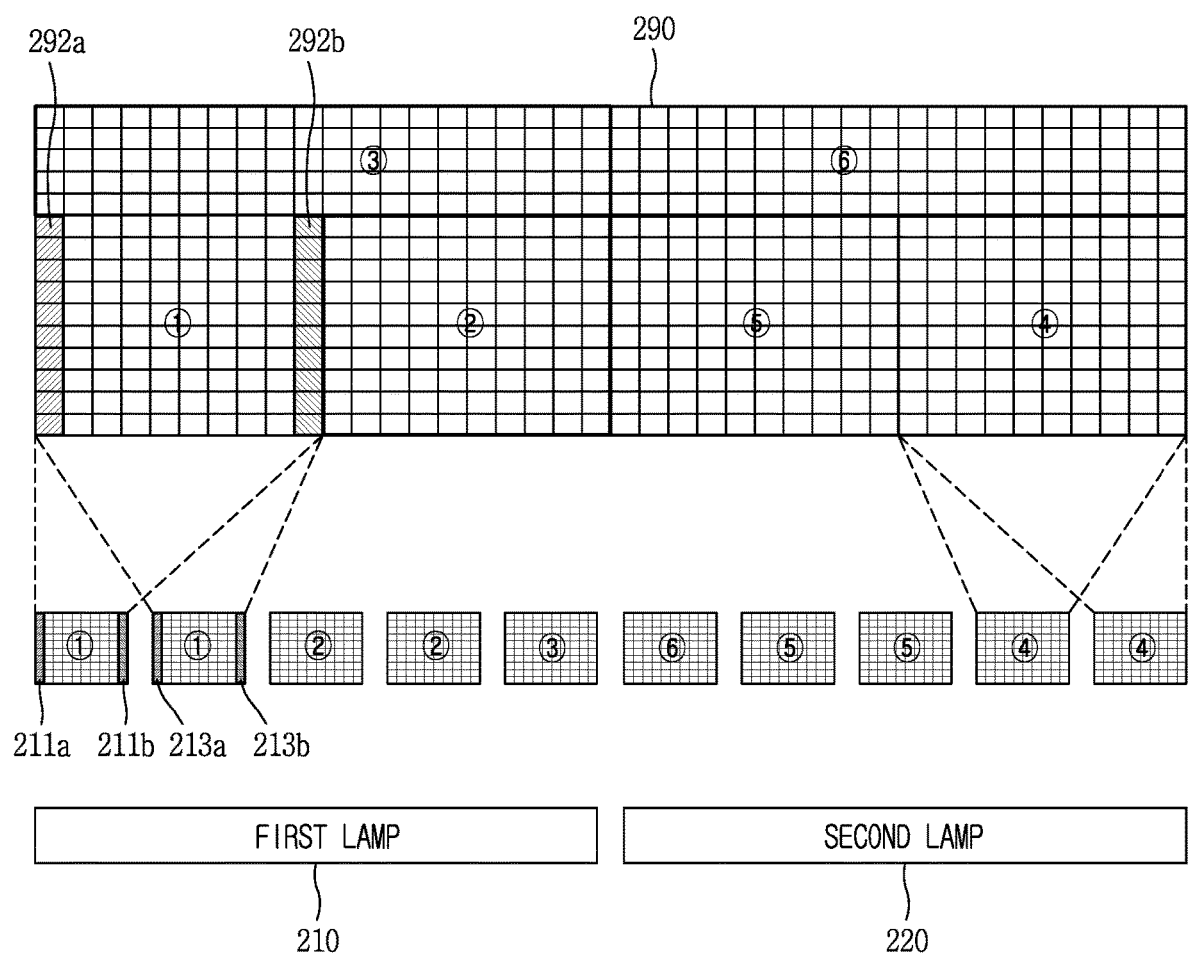

For instance, as shown in the example of FIG. 3D, light emitting diodes 211a included in a first group among light emitting diodes of a first optical module, and light emitting diodes 213a included in a first group among light emitting diodes of a second optical module may irradiate light to a first part 292a of the displayable region. Light emitting diodes 211b included in a second group among the light emitting diodes of the first optical module, and light emitting diodes 213b included in a second group among light emitting diodes of a second optical module may irradiate light to a second part 292b of the displayable region. With such a configuration, the amount of light irradiated onto the first and second parts 292a, 292b may be increased by such overlapping.

A resolution of the lamp may be controlled by controlling the number of optical modules which irradiate light onto the same region. For instance, when three optical modules of 'M×N' pixels irradiate light onto the same region, a resolution of 'M×N×3' may be obtained.

In some implementations, the first part formed by light emitting diodes included in the first group may be included in the low beam region, and the second part formed by light emitting diodes included in the second group may be included in the high beam region. For instance, in optical modules having 'M×N' pixels, rows of 1 to t may implement high beams, and rows of (t+1) to M may implement low beams. With such a configuration, a single optical module may implement high and low beams.

For generation of the first part 292a, each of the light emitting diodes included in the first group may be formed to have a different angle between its direction and a reference direction. For instance, the light emitting diodes 211a arranged at the first optical module included in the first group, and the light emitting diodes 213a arranged at the second optical module included in the first group have different angles on the basis of one direction, thereby irradiating light onto the first part 292a.

In some implementations, the base substrate may be a curved surface that at least part thereof is bent or curved, such that light emitting diodes arranged on the base substrate have different angles on the basis of one direction. For example, a display light source may be flexible that can be bent, curved, twisted, folded, and rolled by an external force.

Accordingly, different partial light distribution patterns may be generated by adaptively bending the base substrate according to a position where different optical modules are arranged. As such, the head lamp for a vehicle may be more efficiently implemented by standardized optical modules (e.g., optical modules 110 of FIG. 1).

In some implementations, the optical modules 110 may further include a driving unit configured to change a direction that each of light emitting diodes included in the optical modules faces. For example, in a case where the reference line is moved laterally, the driving unit may apply an external force to the base substrate to achieve a bent state or a flat state of the base substrate, such that an entire light distribution pattern may be moved along the reference line.

One or more processors (e.g., controller 230 of FIG. 2C) may select a light distribution pattern, and may control the light emitting diodes such that the selected light distribution pattern is formed. For example, the controller may control the optical modules 110 such that light emitting diodes which form the selected light distribution pattern are turned on, and such that light emitting diodes which do not form the selected light distribution pattern are turned off. Thus, light emitting diodes to be turned off may be selectively changed according to the selected light distribution pattern.

Figure 4A:
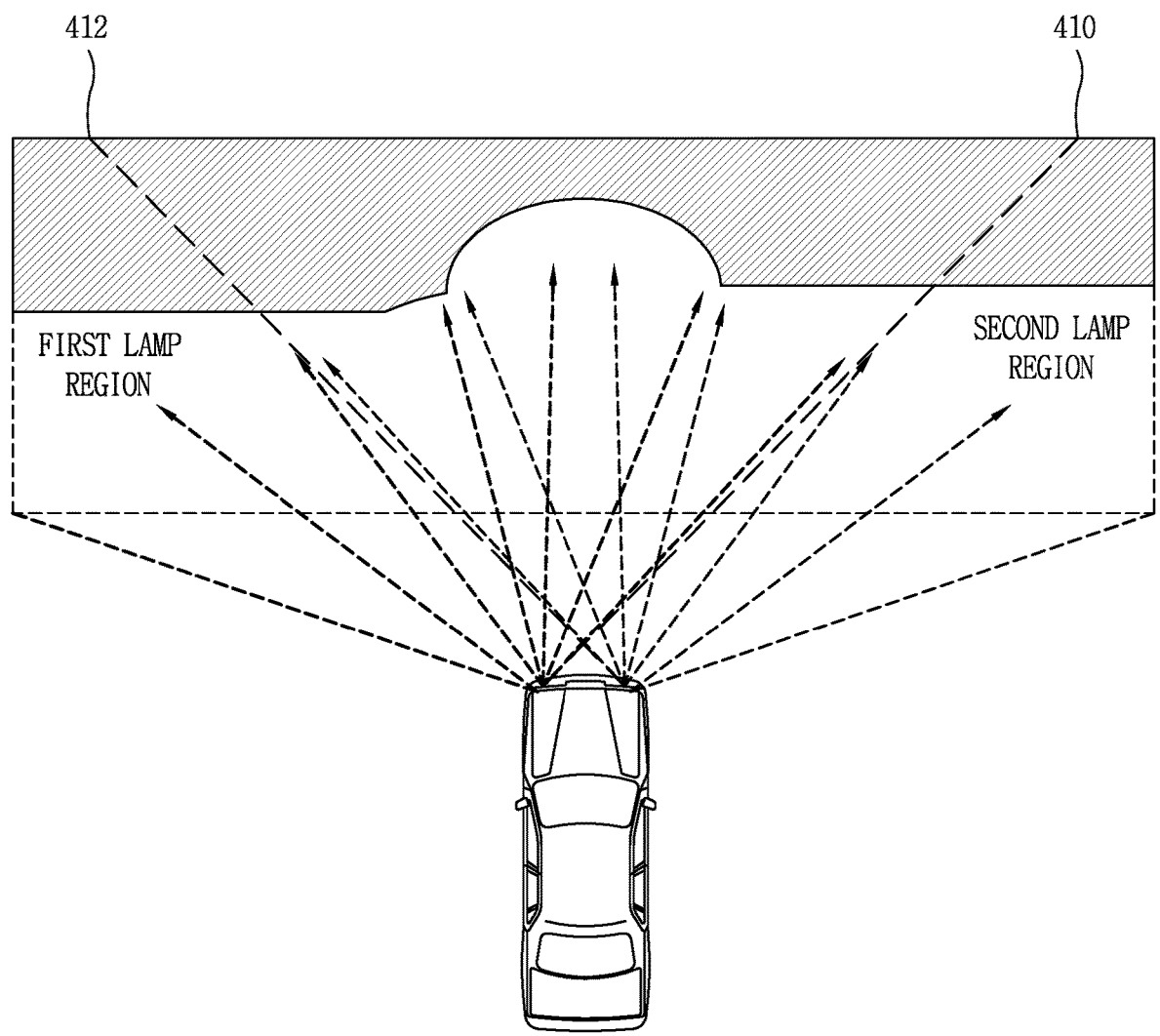
FIGS. 4A to 4C are diagrams illustrating examples of generating an entire light distribution pattern in an overlapped irradiation manner by the first and second lamps included in the vehicle lamp.
Figure 4B:
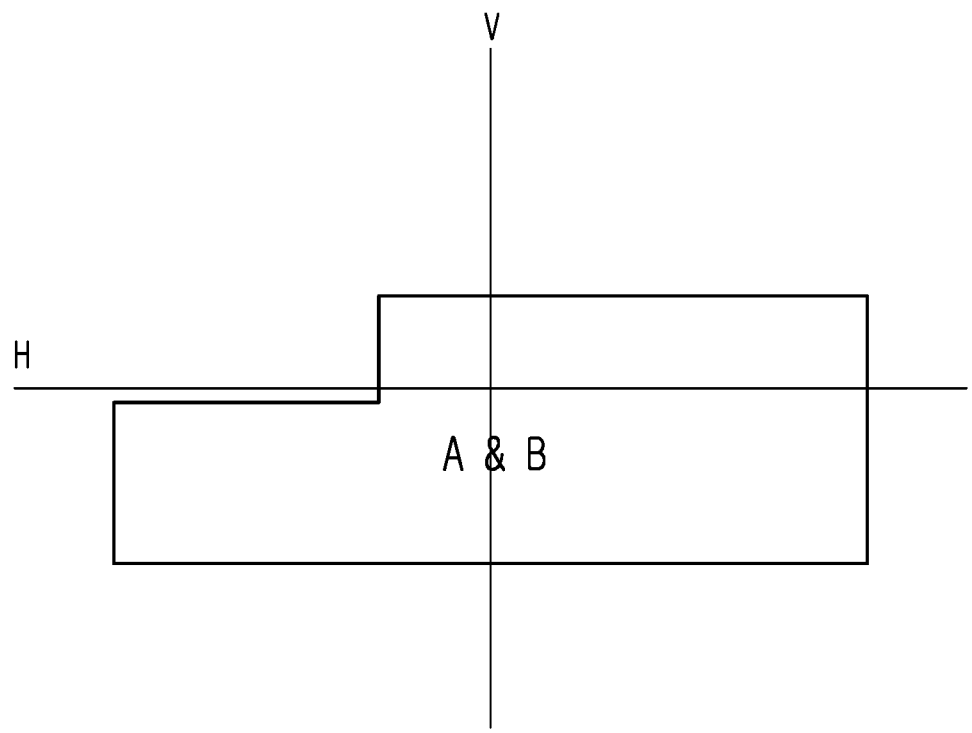
Figure 4C:
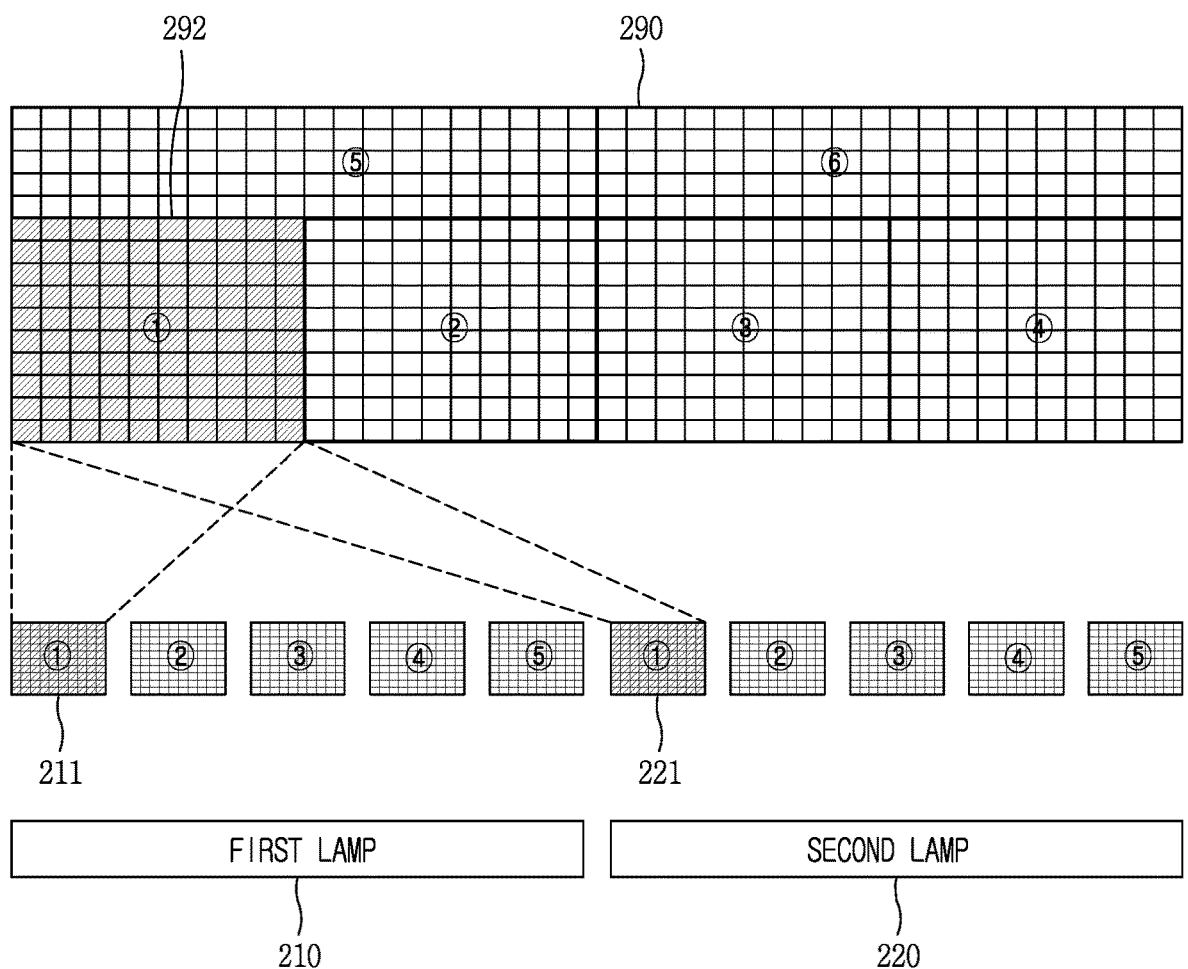

FIGS. 4A to 4C illustrate examples of generating an entire light distribution pattern in an overlapped irradiation manner by first and second lamps included in a vehicle lamp.

As shown in FIG. 4B, unlike the divided irradiation manner of FIGS. 3A to 3D, the overlapped irradiation manner may be implemented such that a first partial light distribution pattern generated by the first lamp 210 and a second partial light distribution pattern generated by the second lamp 220 may have the same shape.

As shown in FIG. 4A, the overlapped irradiation manner may be implemented such that overlapping may occur only on a region between a first reference line 410 generated by the first lamp and a second reference line 412 generated by the second lamp.

In a case where a first partial light distribution pattern generated by the first lamp 210 and a second partial light distribution pattern generated by the second lamp 220 are partially overlapped with each other, the controller may control the light emitting diodes such that an optical amount of an entire light distribution pattern may become constant.

In a scenario where a non-overlapped region is formed by a single light emitting diode, an overlapped region is formed by two light emitting diodes. If a plurality of light emitting diodes emit light with the same brightness, the overlapped region becomes brighter than the non-overlapped region.

In order for an entire light distribution pattern to have a constant optical amount, the controller distinguishes light emitting diodes corresponding to an overlapped region between the first and second partial light distribution patterns, from light emitting diodes corresponding to a non-overlapped region between the first and second partial light distribution patterns. Then, the controller controls a brightness of the light emitting diodes corresponding to the overlapped region, to be different from a brightness of the light emitting diodes corresponding to the non-overlapped region. For instance, when light emitted from the light emitting diodes corresponding to the non-overlapped region has a brightness of 'x', light emitted from the light emitting diodes corresponding to the overlapped region may have a brightness of 'x/2'.

FIG. 4C illustrates an example of an overlapped irradiation method. A light source unit 211 included in a first optical module of the first lamp 210 may irradiate light to the first part 292a of the displayable region 290. A light source unit 221 included in a first optical module of the second first lamp 210 may irradiate light to the first part 292a of the displayable region. As the optical modules included in the different lamps irradiate light onto the same region, an increased optical output amount may be achieved.

In case of the overlapped irradiation method, even if one of the two lamps malfunctions, a driver's view may be obtained by using another of the two lamps.

Hereinafter, a structure of the vehicle lamp using a display light source will be explained in more detail.

FIGS. 5A to 5F illustrate examples of a sectional surface of a vehicle lamp 510 taken along line 'A-A', which illustrate various structures of the vehicle lamp according to the present disclosure.

A light source may include a single base substrate and a plurality of light emitting diodes disposed on the base substrate. The light emitting diodes may be individually turned on/off, and may generate light distribution patterns of different shapes under control of the controller.

The optical module having a display light source may be also applicable to a non-projection type lamp (i.e., a clear type), as well as a projection type lamp.

Figure 5A:
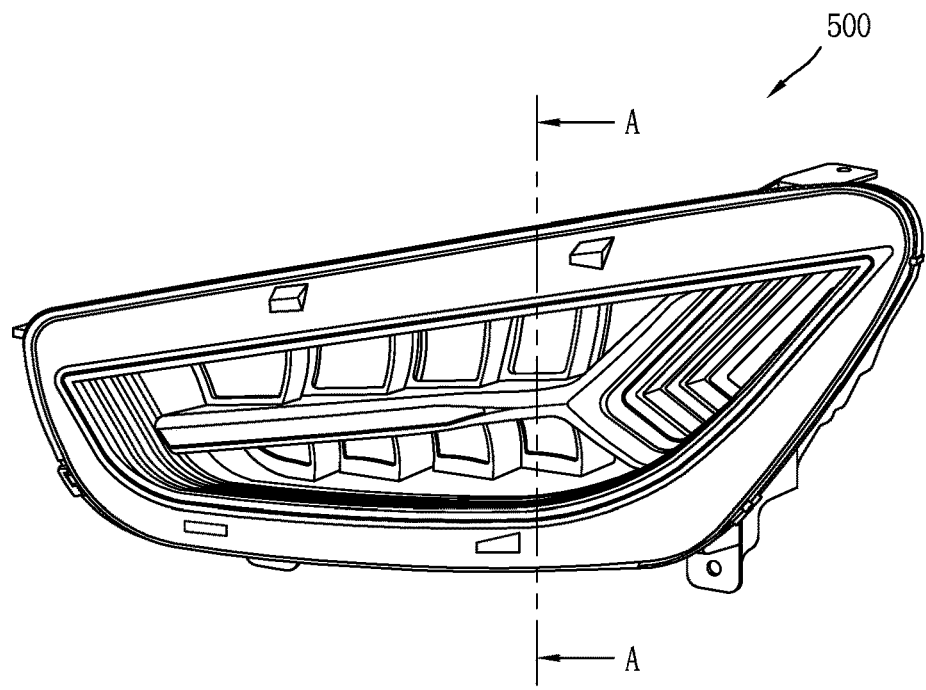
FIGS. 5A to 5F are diagrams illustrating examples of a sectional surface of a vehicle lamp taken along line 'A-A', and examples of various structures of the vehicle lamp according to some implementations.
Figure 5B:
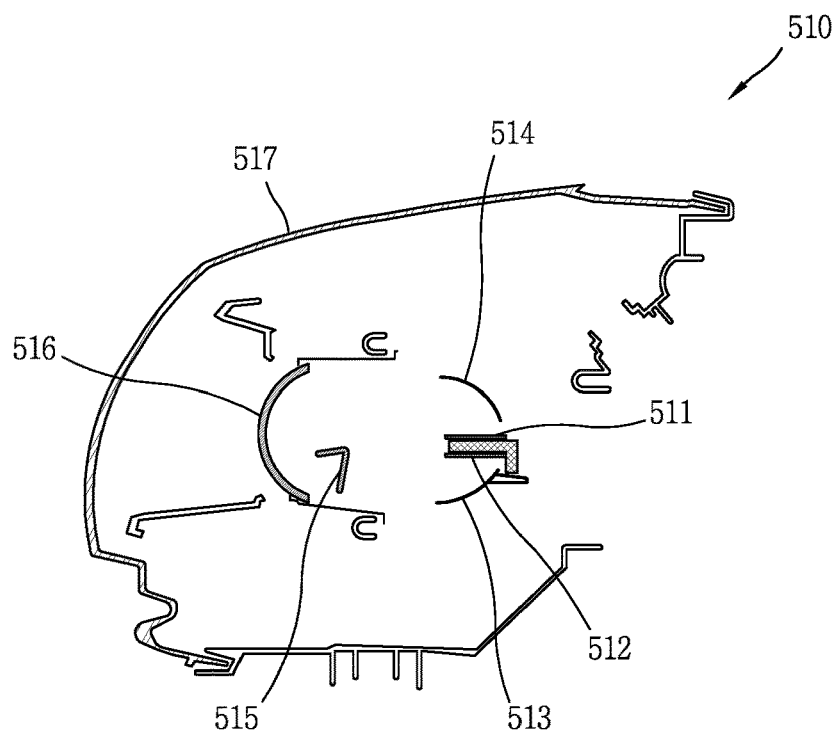

FIG. 5B illustrates a sectional surface of the projection type of vehicle lamp 510 to which a reflector has been applied.

The projection type of vehicle lamp 510 to which a reflector has been applied may include a low beam light source 511, a high beam light source 512, a low beam reflector 513, a high beam reflector 514, a shield 515, a projection lens 516, and an outer lens 517.

In this example, the low beam light source 511 and the high beam light source 512 are positioned at an upper side and a lower side on the basis of an optical axis (Ax) of the vehicle lamp 510, respectively. However, implementations are not limited to this, and the position of the low beam light source 511 and the high beam light source 512 may be variously changed according to a configuration of the vehicle lamp 510, a beam pattern, etc.

The low beam reflector 513 is positioned in a light emission direction of the low beam light source 511, and the high beam reflector 514 is positioned in a light emission direction of the high beam light source 512.

The low beam reflector 513, positioned above the low beam light source 511, may have a reflection surface on an inner side surface thereof. The reflection surface is deposited with a material having a high reflectivity such as aluminum, such that light upward-emitted from the low beam light source 511 is reflected to a front side.

In this example, the low beam reflector 513 of an oval shape has two focal points. One of the two focal points is positioned to correspond to an installation position of the low beam light source 511, and another of them is positioned near a cut-off edge of the shield 515, as explained below. Hereinafter, the focal point positioned near the cut-off edge of the shield 515 will be referred to as a first focal point (F1).

The low beam reflector 513 collects light emitted from the low beam light source 511 to the first focal point (F1), due to an optical characteristic of an oval reflector.

In some implementations, the shield 515 may have an approximate plate shape, and may include a cut-off edge formed to be backward concaved at a front end thereof.

Light emitted from the low beam light source 511 is reflected by the low beam reflector 513 to thus be collected to the first focal point (F1). Then, one part of the light collected to the first focal point (F1) is shielded by the cut-off edge, and another part thereof is incident onto the projection lens 516 via the first focal point (F1).

The light incident onto the projection lens 516 via the first focal point (F1) has a low beam pattern having a cut-off line by the cut-off edge.

A base substrate of the low beam light source 511 has a planar surface, and light emitted from each light emitting diode is made to be irradiated onto a desired region by the low beam reflector 513.

The outer lens 517 is configured to divide the vehicle lamp into the inside and the outside, and to protect the inside of the vehicle lamp from foreign materials.

Figure 5C:
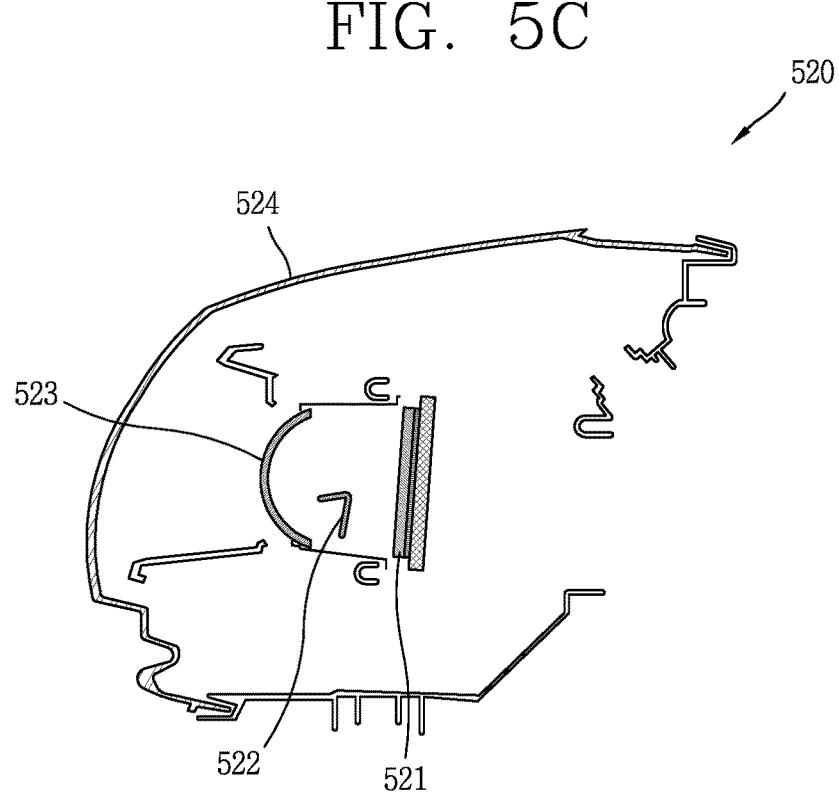

FIG. 5C illustrates a sectional surface of a projection type of vehicle lamp 520 to which no reflector has been applied.

The projection type of vehicle lamp 520 to which no reflector has been applied may include a light source 521, a shield 525, a projection lens 523 and an outer lens 524.

In this case, at least part of the light source 521 may form a low beam pattern, and part of the remaining light sources may form a high beam pattern. The low beam pattern forms a cut-off line by the shield 525.

A bezel portion may be disposed between the projection lens 523 and the light source 521, and the bezel portion may serve as a tunnel.

Figure 5D:
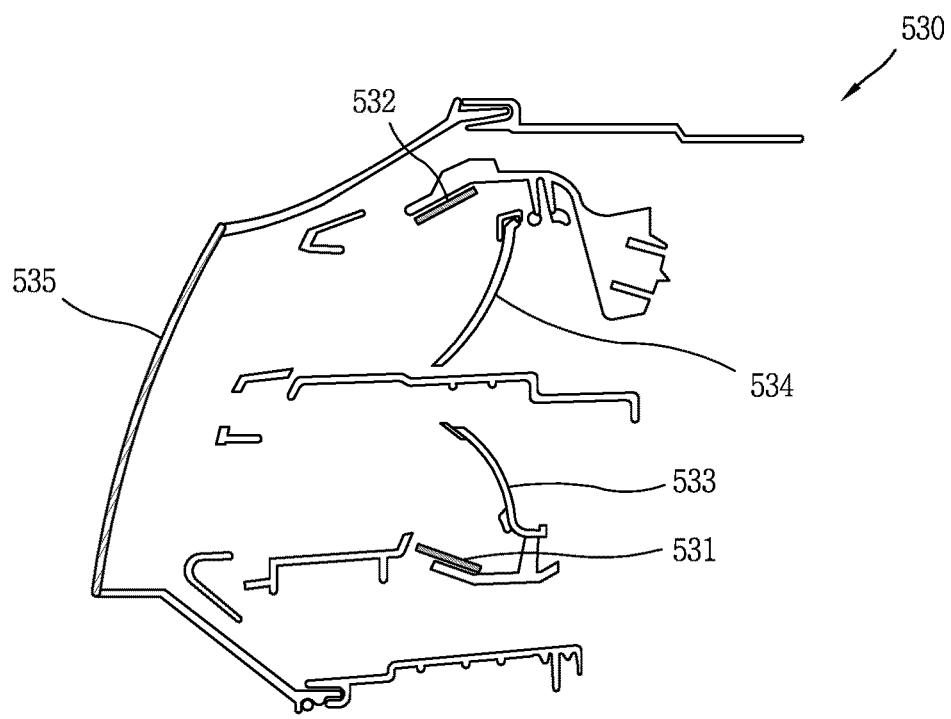

FIG. 5D illustrates a sectional surface of a clear type of vehicle lamp 530 to which a reflector has been applied.

The clear type of vehicle lamp 530 to which a reflector has been applied may include a low beam light source 531, a high beam light source 532, a low beam reflector 533, a high beam reflector 534, and an outer lens 535.

The low beam light source 531 is disposed to be towards the upper side on the basis of an optical axis, and light emitted from the low beam light source 531 is refracted to a different direction by the low beam reflector 533 to form a low beam pattern.

The high beam light source 532 is disposed to be towards a lower side on the basis of the optical axis, and light emitted from the high beam light source 532 is refracted to a different direction by the high beam reflector 534 to form a high beam pattern.

Figure 5E:
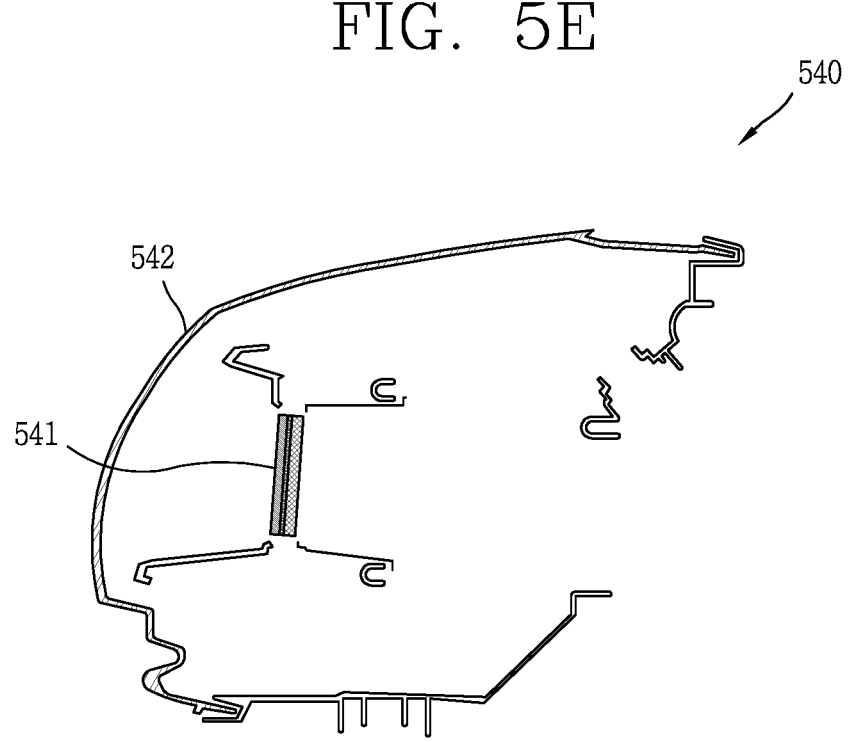

FIG. 5E illustrates a sectional surface of a clear type of vehicle lamp 540 to which no reflector has been applied.

The clear type of vehicle lamp 540 to which no reflector has been applied may include a display light source 541 and an outer lens 542. In this case, the display light source 541 may be checked through the outer lens 542.

A vehicle lamp, to which a reflector has been applied, has a base substrate formed to have a planar surface, since light is refracted by the reflector. In this case, each light emitting diode may have the same angle between its direction and a reference direction.

In case of the vehicle lamp to which no reflector has been applied, light emitted from the display light source is directly irradiated to form a light distribution pattern. In this case, each light emitting diode may have a different angle between its direction and a reference direction, such that a predetermined light distribution pattern may be generated.

Figure 5F:
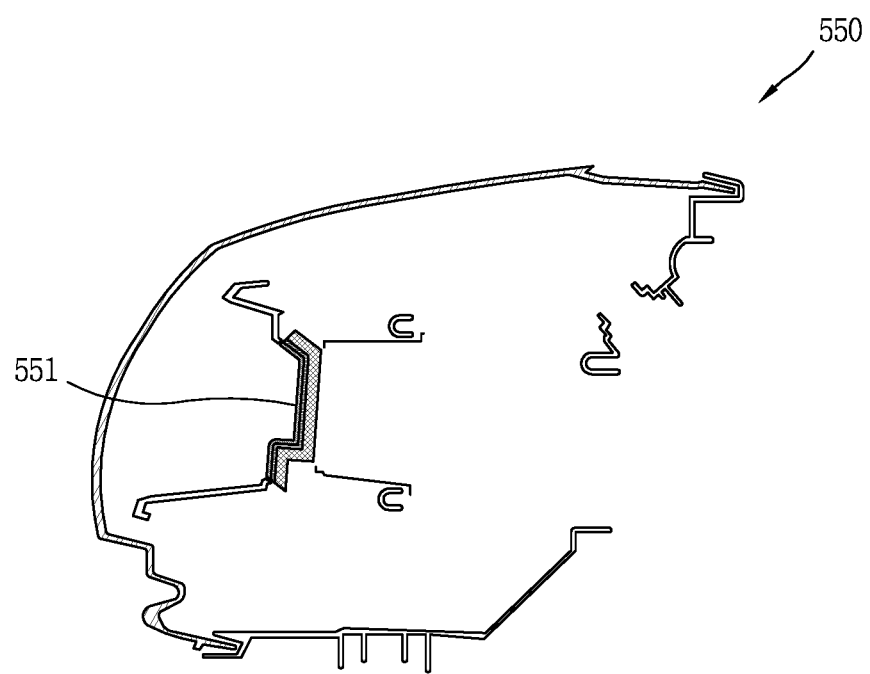

FIG. 5F illustrates a sectional surface of a vehicle lamp having a flexible light source.

In case of the vehicle lamp to which no reflector has been applied, since each light emitting diode may have a different angle between its direction and a reference direction, a base substrate may be formed to be flexible.

In some implementations, a base substrate of the display light source 511 may be formed such that at least part thereof may be bent. The flexible display light source 511 will be explained with reference to FIGS. 11 and 12.

Implementations related to a control method by the aforementioned vehicle lamp will be explained in more detail with reference to the attached drawings.

The following control method may be executed by the aforementioned vehicle lamp or a vehicle having the aforementioned vehicle lamp.

Figure 6:
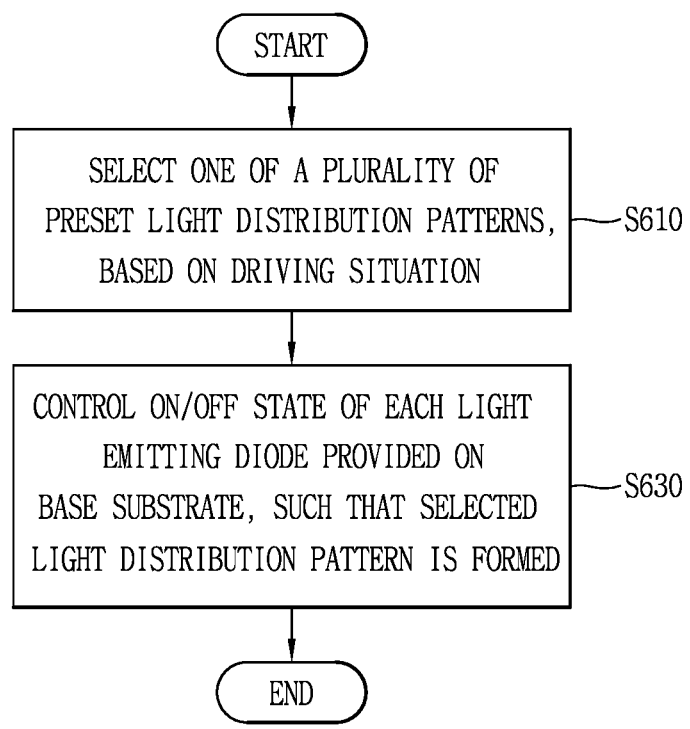
FIG. 6 is a diagram illustrating an example of controlling a vehicle lamp.

FIG. 6 is a flowchart illustrating an example of controlling the vehicle lamp.

The vehicle lamp includes a plurality of optical modules spaced apart from each other. And each optical module includes a base substrate, and a plurality of light emitting diodes disposed on the base substrate and turned on/off individually. The vehicle lamp may turn on some of the plurality of light emitting diodes and turn off the others, such that a preset light distribution pattern may be formed.

The vehicle lamp or a vehicle provided with the vehicle lamp may select one of a plurality of preset light distribution patterns, based on a driving situation (S610).

In order to sense the driving situation, the vehicle lamp or the vehicle may be provided with a sensor for sensing driving information of the vehicle. If the sensor is provided at the vehicle, the vehicle lamp may select one light distribution pattern based on information received from the sensor.

The driving information may include various types of information related to the vehicle and/or sensed by the sensor.

The driving information may include driving-related information sensed at the vehicle and/or at the periphery of the vehicle, such as a steering angle of a steering wheel, a driving direction of the vehicle, a driving speed, a weight, a road characteristic (a road type such as an unpaved road, a highway and a crossroad, a curvature at a curved section, a limit speed of a road, etc.), a brightness outside the vehicle, a weather situation, and an angle between an axis which connects one end and another end of the vehicle on the basis of a driving direction and a gravitational direction.

The driving information may include position information of the vehicle such as GPS information, navigation information, various types of information analyzed from an image captured by an image sensor, and information about an object sensed by radar or lidar (laser radar) and a probability to collide with the object.

The vehicle lamp and/or the vehicle may further include a memory configured to store information about a plurality of light distribution patterns. The memory may store therein database on a type of a light distribution pattern, coordinate values of light emitting diodes to be turned on/off in order to output the light distribution pattern, and a condition to output the light distribution pattern.

The database may be stored by a manufacturing company when the product is presented to the market, and may be edited or updated by a manufacturing company and/or a purchaser after the product is presented to the market. The vehicle lamp or the vehicle may be provided with a wireless communication unit, and may update the database when information is received from a preset server.

Then, the vehicle lamp may control an on/off state of each light emitting diode provided on the base substrate such that a selected light distribution pattern may be formed (S630).

Once the light distribution pattern is selected, light emitting diodes to be turned on and light emitting diodes to be turned off are distinguished from each other such that the selected light distribution pattern is implemented. Even light emitting diodes disposed at the same optical module may be turned on or off according to the selected light distribution pattern.

When a driving situation is changed while the vehicle is driving, the selected light distribution pattern may be changed into a second light distribution pattern from a first light distribution pattern. In this case, the vehicle lamp controls an on/off state of each light emitting diode such that the second light distribution pattern is formed. More specifically, light emitting diodes included in the first and second light distribution patterns maintain an on state. And light emitting diodes included only in the first light distribution pattern are converted into an 'off' state from an 'on' state, and light emitting diodes included only in the second light distribution pattern are converted into an 'on' state from an 'off' state.

In the case where the first light distribution pattern is changed into the second light distribution pattern, for a stable change of a driver's view, the light emitting diodes included only in the first light distribution pattern may become dark gradually for a predetermined time, and then may be turned off when the predetermined time lapses. For safety, the light emitting diodes included only in the second light distribution pattern may be immediately turned on when the conversion is executed.

As the selected light distribution pattern is changed, a cut-off line may be changed.

Hereinafter, implementations to change a light distribution pattern based on driving information will be explained in more detail with reference to FIGS. 7 to 9B.

Figure 7:
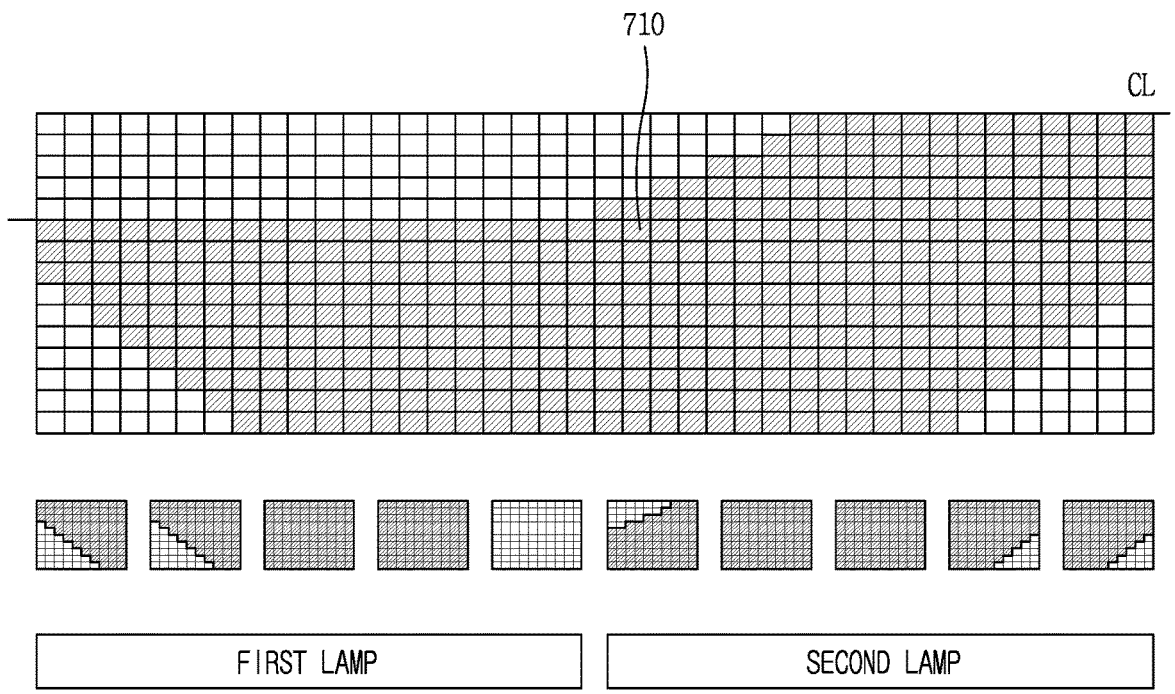
FIG. 7 is a diagram illustrating an example of controlling a vehicle lamp to output a light distribution pattern that satisfies a first condition.
Figure 7:
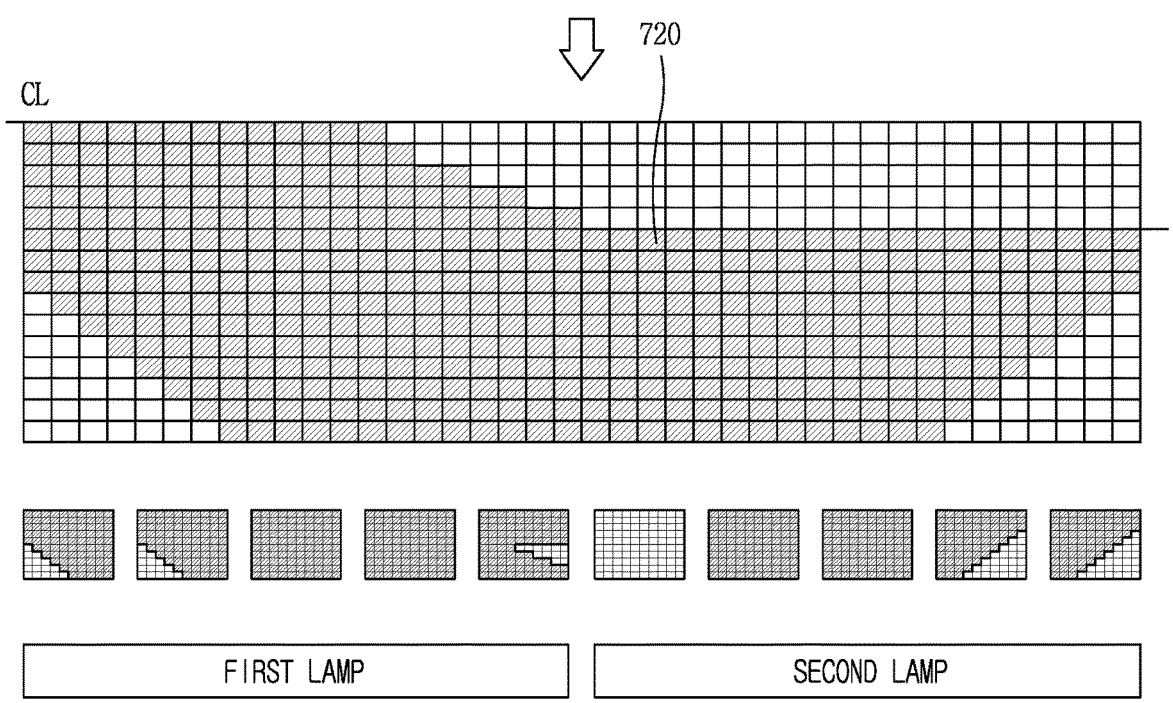

FIG. 7 illustrates an example of controlling a vehicle lamp to generate a light distribution pattern that satisfies a given condition (e.g., a condition established by a legal or regulatory standard).

Some vehicle lamps are produced according to particular laws or regulations. For example, different laws or regulations may establish different cut-off lines based on whether a driver's seat is positioned on the left or on the right of the vehicle (e.g., based on whether an oncoming vehicle would be located on the left or right side of the vehicle). As such, vehicle lamps are typically manufactured in different manners based on the applicable standards or requirements.

Implementations disclosed herein may alleviate such inefficiencies by providing a single type of vehicle lamp that may be adaptively controlled to achieve different output patterns. As such, a vehicle lamp may be manufactured in a common manner to be utilized in different countries and under different scenarios.

Further, in some implementations, a vehicle lamp may implement a memory that stores different light distribution patterns, e.g., according to different standards or requirements. For example, the vehicle lamp may selectively output a light distribution pattern corresponding to a particular country based on a geo-location of the vehicle. For instance, as shown in FIG. 7, when the vehicle provided with the vehicle lamp is located in a country with a left-hand side driving standard, the vehicle lamp may output a light distribution pattern 710 corresponding to a left-hand side driver. Then, if the vehicle provided with the vehicle lamp moves to another location that requires a right-hand driving standard, the vehicle lamp may output a light distribution pattern 720 corresponding to a right-hand driver.

Each light emitting diode is turned on/off according to a selected light distribution pattern, and a cut-off line (CL) is changed according to the selected light distribution pattern.

As such, a vehicle lamp may be developed under a single common specification, and the fabrication cost may be reduced, and a driver may use the vehicle in various countries.

Figure 8A:
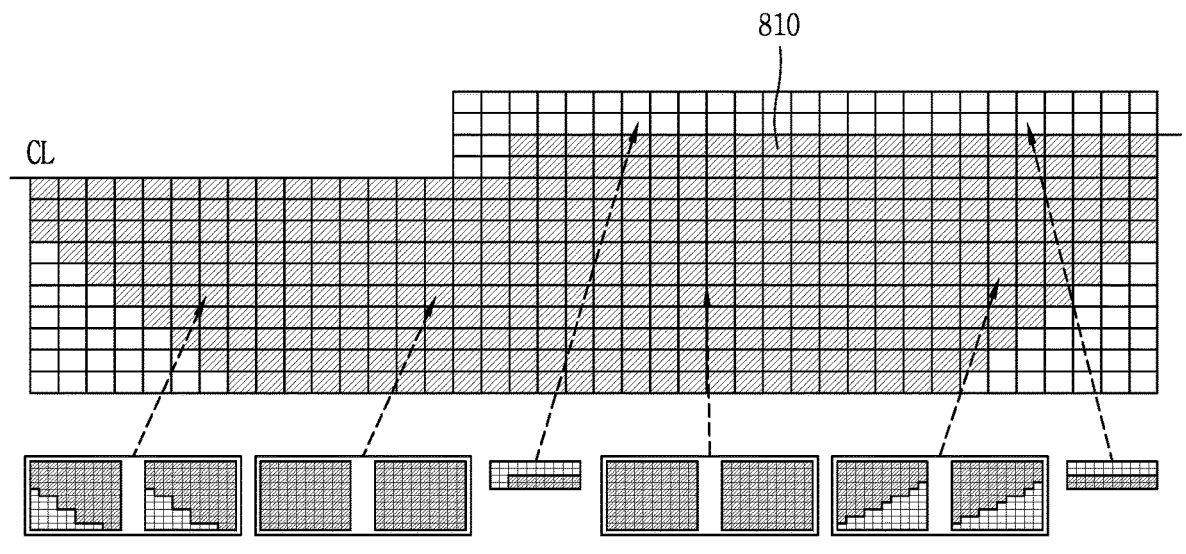
FIGS. 8A and 8B are diagrams illustrating examples of changing a light distribution pattern and/or a cut off line, based on driving information of a vehicle.
Figure 8A:
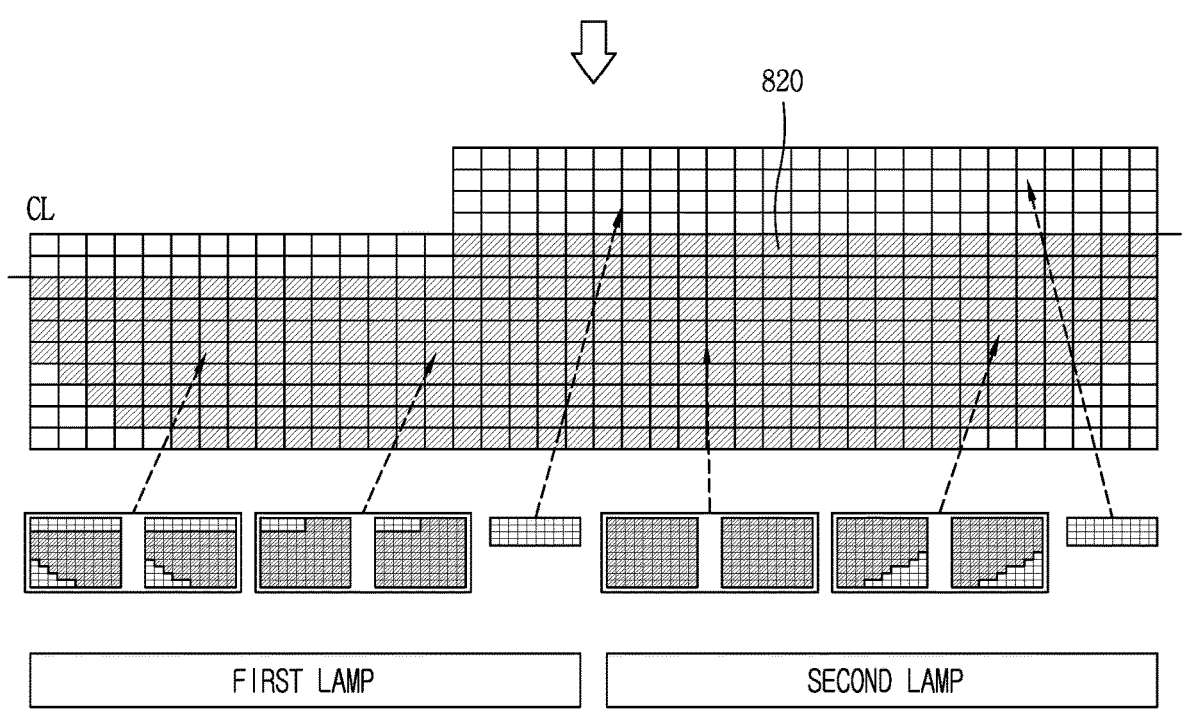
Figure 8B:
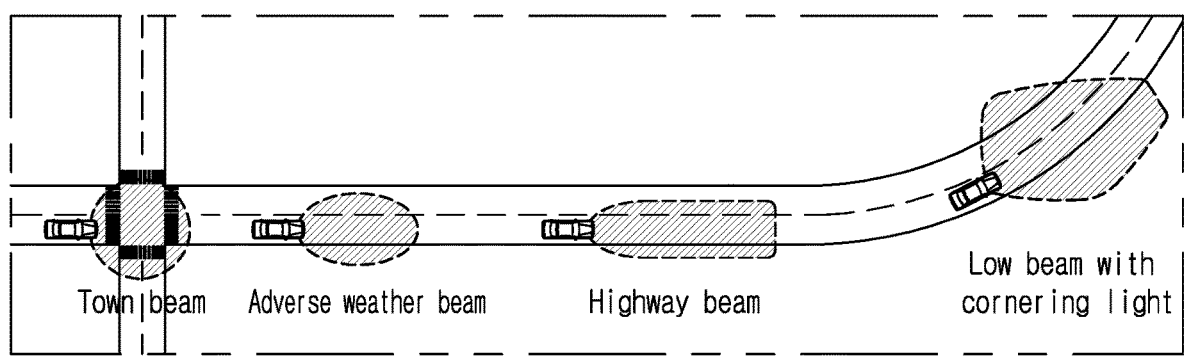

FIGS. 8A and 8B illustrate examples of changing a light distribution pattern and/or a cut off line, based on driving information of the vehicle.

Referring to FIG. 8A, a cut-off line (CL) may be adaptively moved up and down based on driving information, and a light distribution pattern may be correspondingly changed (e.g., from 810 to 820).

For instance, the cut-off line (CL) may be moved up and down according to an angle formed between a vehicle axis (one axis extending from the front side to the rear side of the vehicle) and a horizontal line (or a gravitational direction). As another example, the cut-off line (CL) may be moved up and down according to a height of a center of a camera disposed to face the front side of the vehicle, the height sensed from a ground surface.

As such, an auto leveling may be executed according to an on/off state of each light emitting diode. In this case, the light distribution pattern may be adaptively controlled according to a change of a road surface, a change of a weight of the vehicle, etc.

When a front end of the vehicle becomes higher than a rear end of the vehicle, a direction of the vehicle lamp also becomes higher than a horizontal line. In this case, if the cut-off line (CL) is maintained, a driver of an oncoming car may be disturbed even by low beams generated from the vehicle lamp. Accordingly, the vehicle lamp may change the cut-off line (CL) based on an angle between the vehicle axis and the horizontal line. In this case, a height of the cut-off line based on the horizontal line is changed.

Some vehicle lamps may implement an aiming operation using a motor, etc., in order to move a cut-off line (CL). However, the vehicle lamp of the present disclosure may move the cut-off line (CL) by individually turning on/off light emitting diodes included in the display light source. In this case, a motor or other driving unit may not be required, and the vehicle lamp may have a simplified structure and the fabrication cost may be reduced.

As shown in FIG. 8B, a selected light distribution pattern may be changed based on at least one of a steering angle of a steering wheel provided at the vehicle, and a road characteristic. The light distribution pattern may be also changed according to whether there is an oncoming car, a road type, a roadway radius of curvature, etc., and light emitting diodes to be turned on or off are changed accordingly.

Figure 9A:
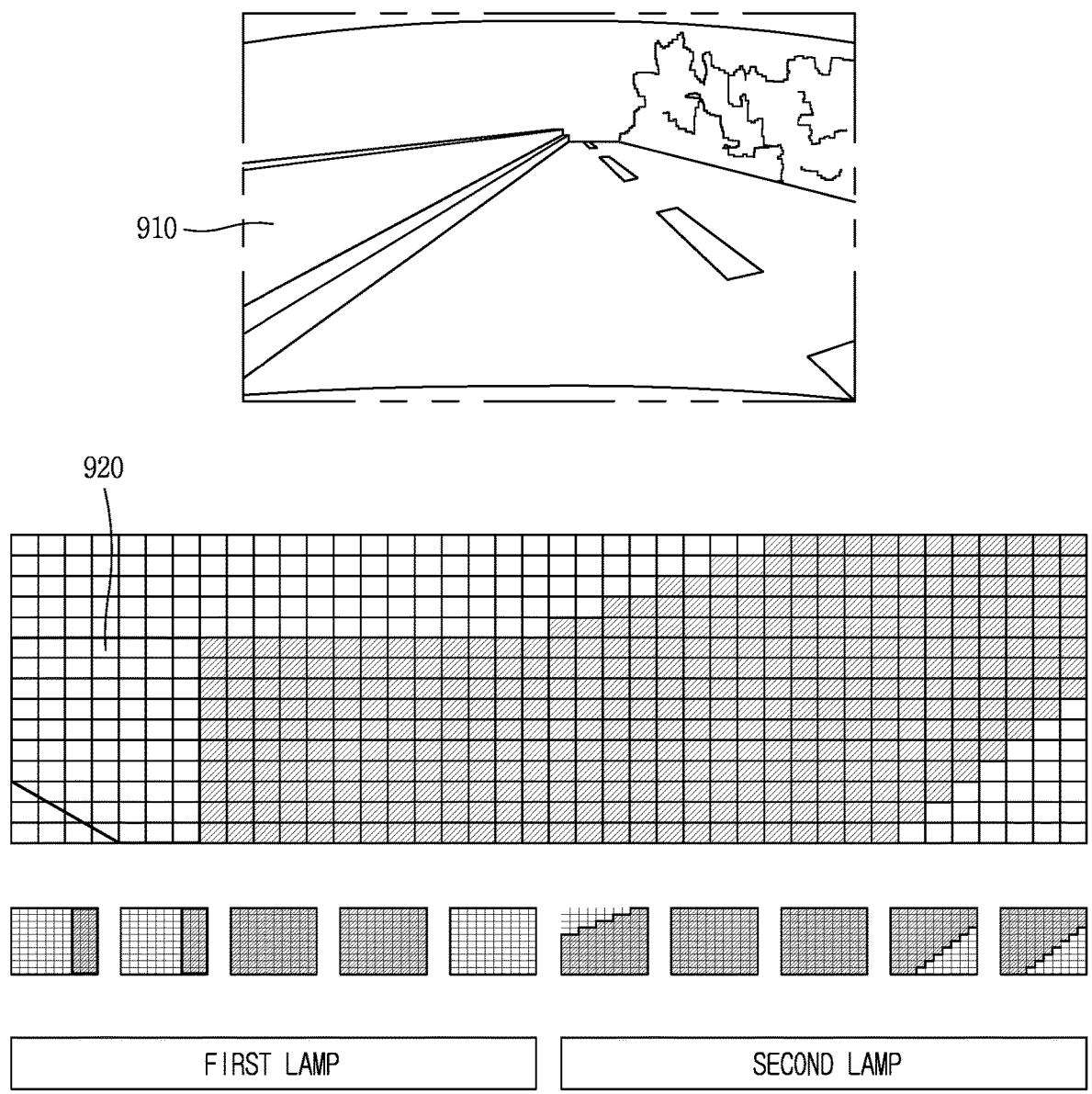
FIGS. 9A and 9B are diagrams illustrating examples of changing a light distribution pattern according to an object sensed at a front side of a vehicle.
Figure 9B:
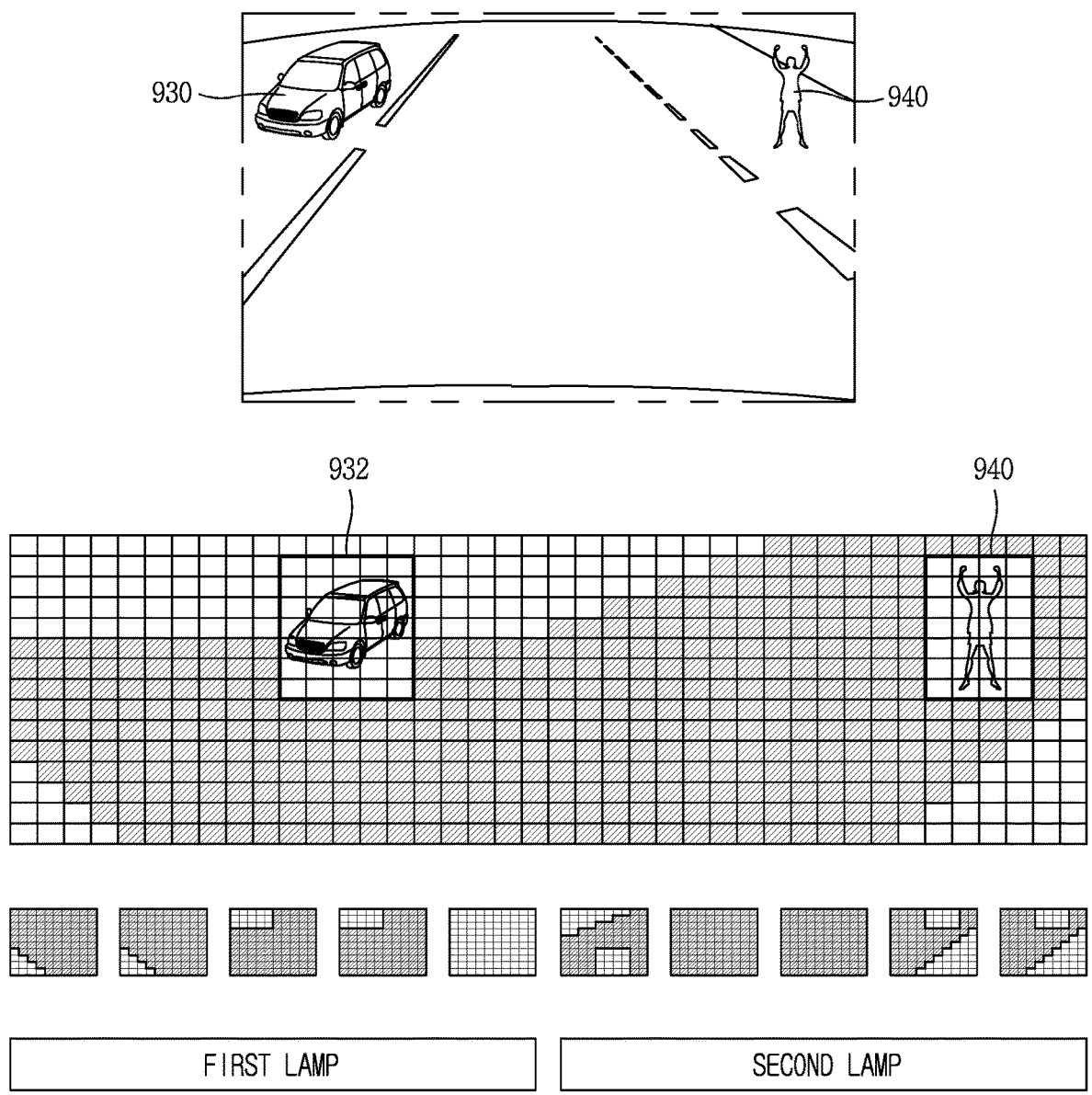

FIGS. 9A and 9B illustrate examples of changing a light distribution pattern according to an object sensed from the front side.

When an object is sensed from a front side to which a light distribution pattern is irradiated, the light distribution pattern may be changed, or light emitting diodes which form a partial region of the light distribution pattern may be controlled such that the partial region corresponding to the object may have a brightness smaller than a predetermined value.

For instance, as shown in FIG. 9A, when there is a median strip 910 on the left or right on the basis of a driving direction, light needs not be irradiated onto a partial region 920 of a light distribution pattern, the partial region corresponding to the median strip 910. For prevention of unnecessary power consumption, the controller may turn off at least one of light emitting diodes which form the partial region 920, or may reduce a brightness of said at least one light emitting diode.

As another example, as shown in FIG. 9B, upon sensing of an oncoming car 930 and/or a pedestrian 940 who is staring at the vehicle, light emitting diodes which form a first region 932 corresponding to the oncoming car 930 and/or a second region 942 corresponding to the pedestrian 940 may be controlled to have brightness values smaller than predetermined values. Accordingly, a driver of the oncoming car 930 or the pedestrian 940 may move without glare.

The vehicle lamp of the present disclosure may control a light distribution pattern to have a different brightness, by turning on/off each light emitting diode or by controlling a brightness of each light emitting diode.

Figure 10:
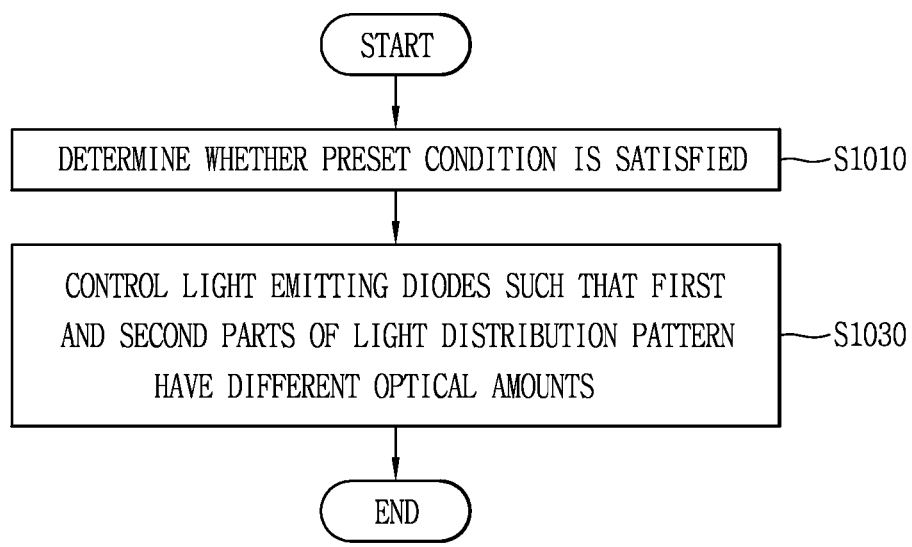
FIGS. 10 and 11 are diagrams illustrating examples of generating a brightness difference in a light distribution pattern.
Figure 11:
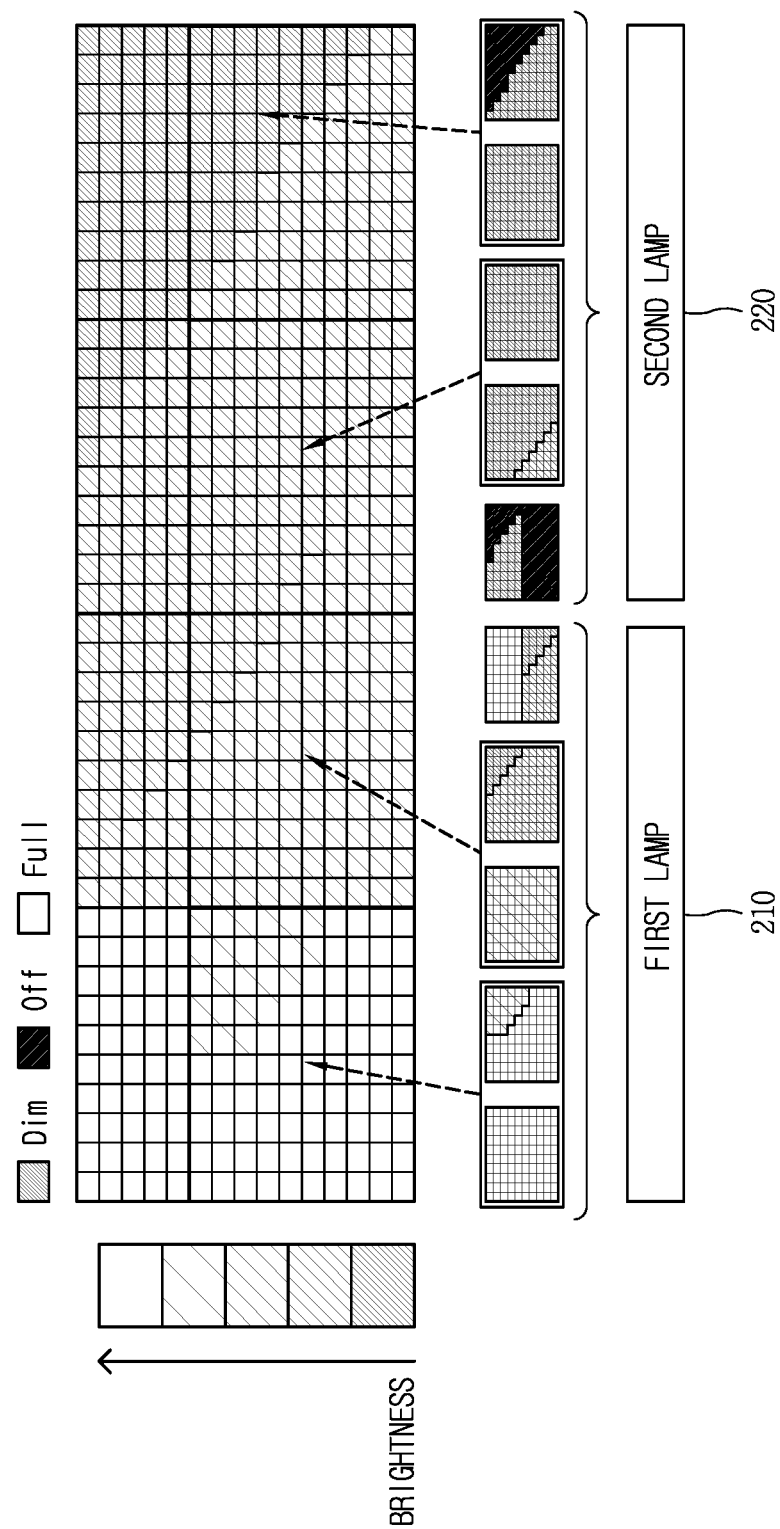

FIGS. 10 and 11 illustrate examples of generating a brightness difference at a light distribution pattern.

Firstly, the vehicle lamp or the vehicle determines whether a preset condition is satisfied (S1010). The preset condition may include a condition set to change a brightness of at least part of a light distribution pattern while the light distribution pattern is maintained. For instance, the preset condition may be satisfied when an oncoming car or a pedestrian appears at a predetermined space where a light distribution pattern is irradiated, or when a light distribution pattern of the vehicle is overlapped with a light distribution pattern of another vehicle.

If the preset condition is satisfied, the vehicle lamp controls light emitting diodes such that a first part and a second part of the light distribution pattern have different optical amounts (or brightness values) (S1030).

More specifically, the vehicle lamp may control the first part to have an optical amount different from that of the second part, using light emitting diodes included in a first group corresponding to the first part.

Here, the first part may be generated by a first optical module among optical modules included in the vehicle lamp 100, and the second part may be generated by a second optical module among the optical modules included in the vehicle lamp 100. Alternatively, the first part may be generated by light emitting diodes included in a first LED group among a plurality of light emitting diodes included in the same optical module, and the second part may be generated by light emitting diodes included in a second LED group among the plurality of light emitting diodes included in the same optical module.

For instance, if the first part is overlapped with a light distribution pattern of another vehicle, the second part may not be overlapped with the light distribution pattern of said another vehicle. If an irradiation space of the first part is sufficiently bright by light emitted from the another vehicle, then the vehicle lamp may control the light emitting diodes such that the first part becomes darker than the second part. As such, among an entire region of a light distribution pattern, a brightness of a different region may be controlled according to a preset condition. In this case, the preset condition may be an external brightness of the vehicle (e.g., irradiation from another vehicle).

For instance, in a case where first and second light emitting diodes form the first part and third and fourth light emitting diodes form the second part, at least one of the first and second light emitting diodes may be turned off such that the first part may become darker than the second part. That is, an optical amount of the first part may be controlled by turning off at least one of the light emitting diodes which form the first part.

Alternatively, the first part may be controlled to have a low brightness than the second part, by controlling at least one of the first and second light emitting diodes to have a lower brightness than the third and fourth light emitting diodes. That is, an optical amount of the first part may be controlled by differently controlling a brightness of each of the light emitting diodes which form the first part.

As shown in FIG. 11, the light emitting diodes may be controlled such that a light distribution pattern may have a gradation. As each of the light emitting diodes has its brightness changed, different regions of the light distribution pattern become brighter or darker gradually with continuity. This may allow a driver to obtain a front view more easily.

Figure 12:
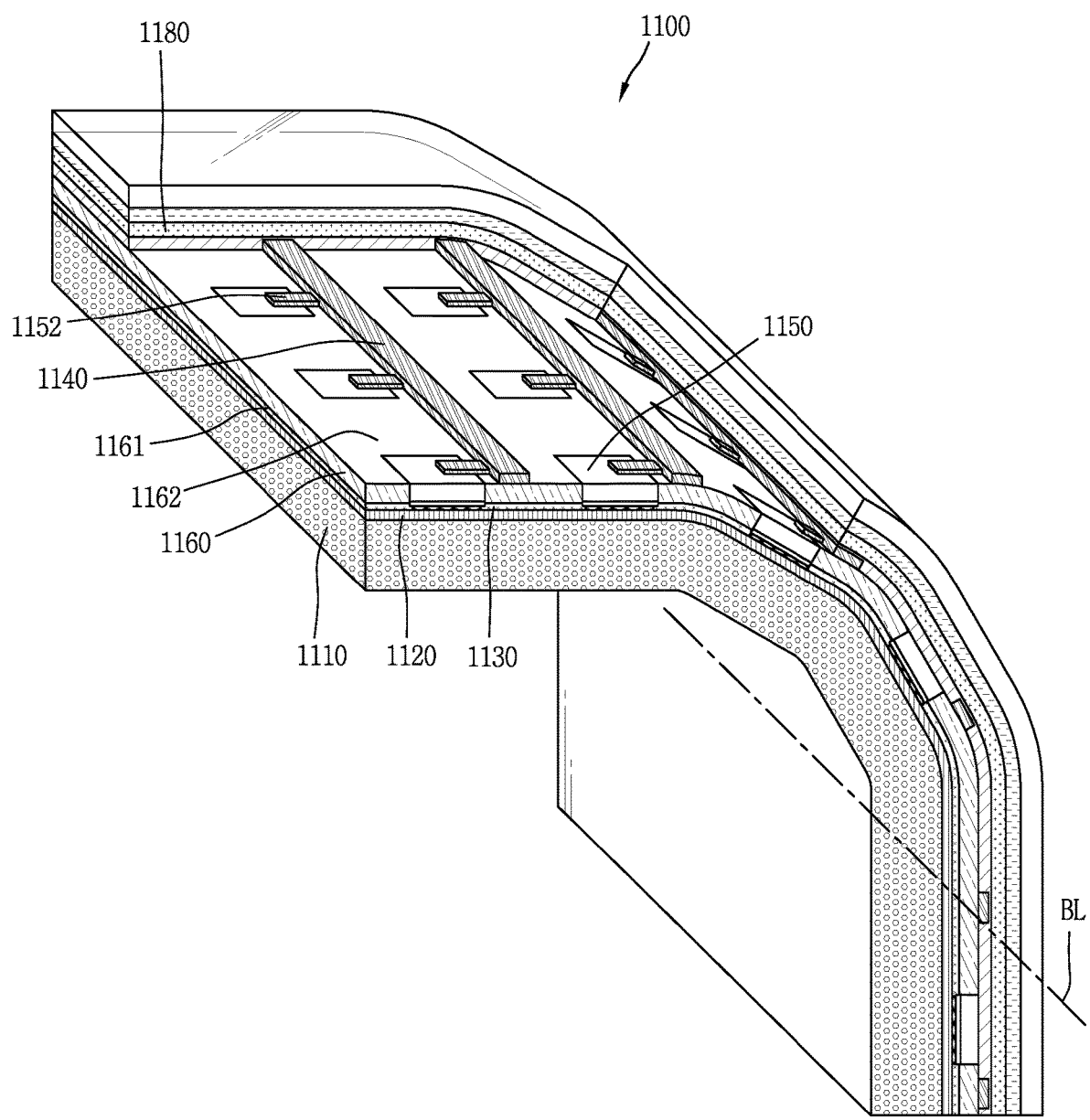
FIGS. 12 and 13 are diagrams illustrating examples of a light source provided in a vehicle lamp.
Figure 13:
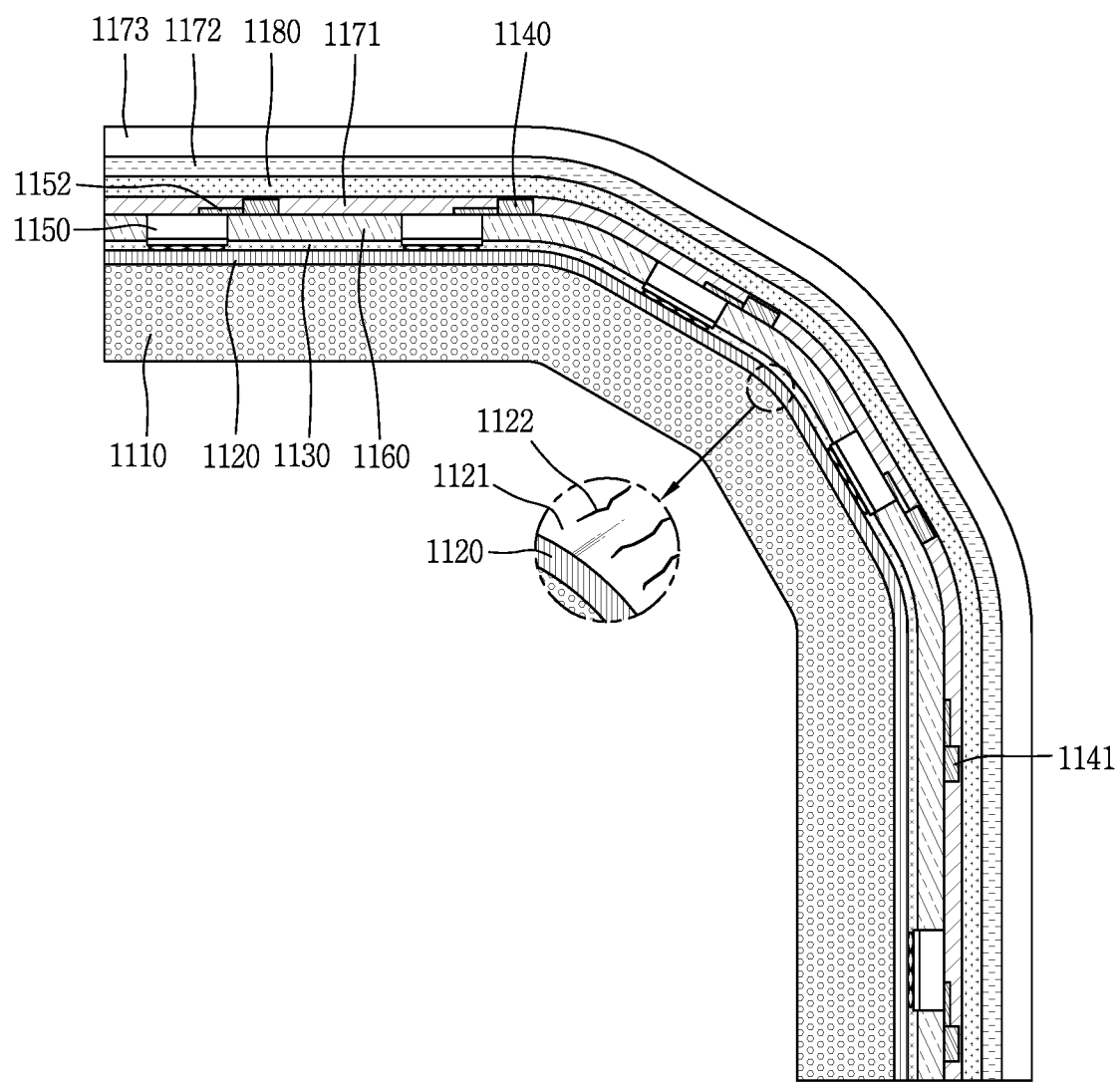

FIGS. 12 and 13 illustrate examples of a light source provided in the vehicle lamp 100.

The vehicle lamp 100 according to some implementations includes a frame fixed to a vehicle body, and a light source unit 1100 installed at the frame.

Electric lines for supplying power to the light source unit 1100 are connected to the frame, and the frame may be fixed to the vehicle body directly or through a bracket. As shown, a lens unit may be provided such that light emitted from the light source unit 1100 may be more distributed and may become clearer.

The light source unit 1100 may be a flexible light source unit which can be bent, curved, twisted, folded and rolled by an external force.

When the light source unit 1100 is not bent (for example, in a state with an infinite radius of curvature and referred to as a first state), the light source unit 1100 has a flat surface. When the light source unit 1100 is bent from the first state by an external force (for example, a state with a finite radius of curvature and referred to as a second state), the light source unit 1100 has a curved surface or a bent surface.

Pixels of the light source unit 1100 may be implemented by semiconductor light emitting diodes. For example, the semiconductor light emitting diodes for converting a current into light may be implemented as light emitting diodes (LEDs). The light emitting diodes may be formed to have a small size to serve as the pixels even in the second state.

FIGS. 12 and 13 illustrate an example in which a passive matrix (PM) type of semiconductor light emitting diodes are used for the light source unit 1100. However, the following descriptions may be also applicable to active matrix (AM) type of semiconductor light emitting diodes.

The light source unit 1100 includes a base substrate 1110, a first electrode 1120, an adhesion layer 1130, a second electrode 1140, and a plurality of semiconductor light emitting diodes 1150.

The base substrate 1110 is a base layer having a structure formed through entire processes, and may be a wire substrate where the first electrode 1120 is arranged.

The first electrode 1120 is positioned on the base substrate 1110, and may be formed as a surface type electrode. Thus, the first electrode 1120 may be an electrode layer disposed on the base substrate, and may serve as a data electrode.

The adhesion layer 1130 is formed on the base substrate 1110 where the first electrode 1120 is positioned.

The adhesion layer 1130 may be a layer having an adhesive property and a conductivity, and a conductive material and an adhesive material may be mixed with each other at the adhesion layer 1130. Thus, the adhesion layer 1130 may be referred to as a conductive adhesion layer. And the adhesion layer 1130 has flexibility, which allows the light source unit to have a flexible function.

For instance, the adhesion layer 1130 may be an anisotropy conductive film (ACF), an anisotropy conductive paste, a solution containing conductive particles, etc. The adhesion layer 1130 allows an electric reciprocal connection in a Z-direction which penetrates the adhesion layer 1130, but may be a layer having an electrical insulation property in an X-Y direction (a horizontal direction). Thus, the adhesion layer 1130 may be referred to as a Z-axis conductive layer.

After positioning the first electrode 1120 on the base substrate 1110, e.g., after positioning an anisotropy conductive film on the base substrate 1110, if the semiconductor light emitting diodes 1150 are connected to the first electrode 1120 by applying heat and a pressure, the semiconductor light emitting diodes 1150 are electrically connected to the first electrode 1120. In this case, the semiconductor light emitting diodes 1150 are preferably positioned on the first electrode 1120. Since the anisotropy conductive film contains an adhesive ingredient, the adhesion layer 1130 implements a mechanical coupling between the semiconductor light emitting diodes 1150 and the first electrode 1120, as well as an electrical coupling therebetween.

The semiconductor light emitting diodes 1150 may constitute a unit pixel even with a small size, due to an excellent brightness thereof. Each of the semiconductor light emitting diodes 1150 may have a size enough for one side thereof to have a length of 80 µm or less than, and may have a rectangular or square shape. In this case, each of the semiconductor light emitting diodes 1150 may have an area of 10-10~10-5 m$^2$, and an interval between the semiconductor light emitting diodes 1150 may be within a range of 100 µm~10 mm.

The semiconductor light emitting diodes 1150 may have a vertical structure.

The plurality of second electrodes 1140 are positioned between the vertical type of semiconductor light emitting diodes, and the plurality of second electrodes 1140 are electrically connected to the semiconductor light emitting diodes 1150.

The vertical type of semiconductor light emitting diode includes a p-type electrode, a p-type semiconductor layer formed on the p-type electrode, an activation layer formed on the p-type semiconductor layer, an n-type semiconductor layer formed on the activation layer, and an n-type electrode formed on the n-type semiconductor layer. In this case, the p-type electrode disposed at a lower side may be electrically connected to the first electrode by an adhesion layer, and the n-type electrode disposed at an upper side may be electrically connected to the second electrode. In the vertical type of semiconductor light emitting diodes, since the electrodes are disposed up and down, a chip size may be reduced.

The plurality of semiconductor light emitting diodes 1150 constitute a light emitting diode array, and an insulation layer 1160 is formed between the plurality of semiconductor light emitting diodes 1150. For instance, the insulation layer 1160 is formed on one surface of the adhesion layer 1130, thereby filling a space between the semiconductor light emitting diodes 1150.

However, the present disclosure is not limited to this. That is, only the adhesion layer 1130 without the insulation layer 1160 may be used to fill the space between the semiconductor light emitting diodes 1150.

A phosphor layer 1180 is formed on the light emitting diode array.

The phosphor layer 1180 may be formed on one surface of the semiconductor light emitting diodes 1150. For instance, the semiconductor light emitting diodes 1150 may be blue semiconductor light emitting diodes 1151 which emit blue light (B), and the phosphor layer 1180 may be provided to convert the blue light (B) into light of another color. In this case, the phosphor layer 1180 may be provided with a red phosphor for converting blue light into red light (R), a green phosphor for converting blue light into green light (G), or a yellow phosphor for converting blue light into white light (W).

In this case, an optical gap layer 1171 may be disposed between the semiconductor light emitting diodes 1150 and the phosphor layer 1180. The optical gap layer 1171 may be formed of a material having a small optical absorption rate and an excellent bending characteristic, such as epoxy, acryl, and methyl or phenyl-based silicone. A sheet patterned for optimum light efficiency may be inserted into the optical gap layer 1171, or particles having different refractive indexes may be mixed with each other at the optical gap layer 1171.

A color filter 1172 may be laminated on the phosphor layer 1180 to enhance a color purity of converted light. And a protection layer 1173 may be formed to cover the color filter 1172 in order to protect the light source unit 1100 from moisture, oxygen and an external impact. In this case, the protection layer 1173 may be implemented as a film is attached onto the color filter 1172, or as resin coating is executed on the color filter 1172.

In another implementation, the first electrode 1120 (electrode layer) is provided with a common electrode surface 1121 with which each of the light emitting diodes is overlapped, and at least part of the common electrode surface 1121 may be bent. That is, the first electrode 1120 is formed as a surface electrode, and is operated as a common electrode.

The common electrode surface 1121 is formed to cover spaces between the semiconductor light emitting diodes 1150, such that light is reflected between the semiconductor light emitting diodes 1150. This may allow the electrode layer to have a high-reflection structure, resulting in high light efficiency.

The common electrode surface 1121 may be overlapped with 10~100000 semiconductor light emitting diodes, and the semiconductor light emitting diodes cover the common electrode surface 1121 in the form of an array.

For instance, the semiconductor light emitting diodes 1150 may be arranged in the form of matrices, and the common electrode surface 1121 may be overlapped with the semiconductor light emitting diodes 1150 in upper, lower, right and left directions. More specifically, the semiconductor light emitting diodes 1150 may be arranged in rows and columns, and the common electrode surface 1121 may be overlapped with each of the semiconductor light emitting diodes 1150 arranged in rows and columns.

As another example, the semiconductor light emitting diodes 1150 may be arranged in an irregular manner, and the common electrode surface 1121 may cover all of the semiconductor light emitting diodes 1150 arranged in an irregular manner.

As another example, the electrode layer may be provided with a plurality of unit electrode layers, and each of the unit electrode layers may be provided with a unit common electrode surface formed to have a size corresponding to each of the plurality of semiconductor light emitting diodes. As the unit common electrode surfaces are electrically connected to each other, a surface light source of a large area may be easily implemented. In this case, since optical modules may be formed to have various shapes and sizes and the light source unit may be replaced, the vehicle lamp may be easily repaired and may have a long lifespan.

Since the first electrode 1120 is formed as a surface electrode, disconnection which may occur when the common electrode surface 1121 is bent may be attenuated or prevented. More specifically, since the light source unit is attachable to a curved surface or a bent surface of the aforementioned frame, at least part of the common electrode surface 1121 may be bent. In this case, the electrode layer may be provided with one or more grooves 1122. The groove 1122 may be provided with a crack disposed at the bent part of the common electrode surface 1121. As the groove is formed at the bent part of the common electrode surface 1121, an elastic restoration force of the light source unit 1100 becomes weak even if the common electrode surface 1121 is formed of a metallic material. This may allow the light source unit 1100 to be more easily attachable to a curved surface or a bent surface of the frame. Further, since the crack is generated, disconnection of lines does not occur since the first electrode is a surface electrode.

The second electrode 1140 is positioned between the semiconductor light emitting diodes 1150, and is electrically connected to the semiconductor light emitting diodes 1150. For instance, the semiconductor light emitting diodes 1150 may be arranged in a plurality of columns, and the second electrode 1140 may be positioned between the semiconductor light emitting diodes 1150.

The second electrode 1140 may be formed as a bar type electrode long in one direction. In this case, the second electrode 1140 may be formed to extend along a bending line (BL) of the bent part of the common electrode surface 1121. For instance, the second electrode 1140 may be formed in parallel to the bending line (BL). In this case, since the second electrode 1140 of a line shape is not bent, inferiority of lines does not occur. That is, an electrode stress may be minimized and occurrence of a crack may be prevented, through the n-type electrode 1152 parallel to the bending line (BL).

As shown, the second electrode 1140 and the semiconductor light emitting diode 1150 may be electrically connected to each other by a connection electrode protruded from the second electrode 1140. For example, the connection electrode may be the n-type electrode 1152 of the semiconductor light emitting diode 1150. For instance, the n-type electrode 1152 is formed as an ohmic electrode for ohmic contact, and the second electrode 1140 covers at least part of the ohmic electrode by printing or deposition. With such a configuration, the second electrode 1140 may be electrically connected to the n-type electrode 1152 of the semiconductor light emitting diode 1150.

As shown, the second electrode 1140 may be positioned on the insulation layer 1160. However, the present disclosure is not limited to this. For example, in a case where only the adhesion layer 1130 without the insulation layer 1160 is used to fill a space between the semiconductor light emitting diodes 1150, the second electrode 1140 may be positioned on the adhesion layer 1130.

As shown, the second electrode 1140 may be integrally formed with the n-type electrode 1152, and the n-type electrode 1152 of the semiconductor light emitting diode may extend to one surface of the insulation layer 1160. However, the present disclosure is not limited to this. That is, the second electrode 1140 may be integrally formed with the p-type electrode 1156. More specifically, the first electrode (electrode layer) may be connected to one of the p-type electrode 1156 and the n-type electrode 1152 of the semiconductor light emitting diode, and another of the p-type electrode 1156 and the n-type electrode 1152 may extend to one surface of the insulation layer 1160.

The insulation layer 1160 may include a first plane 1161 which covers the electrode layer; and a second plane 1162 formed on the opposite side to the first plane 1161, and having holes through which the semiconductor light emitting diodes are exposed to the outside. In order to extend the second electrode 1140 toward the second plane 1162, the second plane 1162 may be formed on the same plane as the n-type semiconductor layer 1153 of the semiconductor light emitting diode.

As shown, one or more conductors 1141, not electrically connected to the semiconductor light emitting diodes, may be disposed on one surface of the insulation layer 1160. The conductor 1141 may be formed at a position where no semiconductor light emitting diode is formed, when the second electrode 1140 is deposited. Thus, the conductor 1141 may be formed of the same material as another of the p-type electrode 1156 and the n-type electrode 1152.

As shown, the insulation layer 1160 may be formed to fill a gap between the conductor 1141 and the electrode layer. In some scenarios, this may help prevent a short-circuit between the conductor 1141 and the electrode layer, and thus, the conductor 1141 and the first electrode 1120 may be mitigated from being short-circuited.

In some scenarios, implementations of the vehicle lamp of the present disclosure may have one or more of the following advantages.

Firstly, the entire processes may be simplified through the electrode layer having the common electrode surface, and light efficiency may be enhanced since high reflection is executable at the electrode layer. Further, as the common electrode surface is bent, a flexible surface light source, bent in correspondence to a 3D shape of the vehicle lamp, may be implemented.

Further, owing to the common electrode surface, a current supply and a voltage control are facilitated, and an additional structure such as a light guide is not required. Further, lowering of uniform light distribution which may occur from a large surface light source, due to a non-uniform current supply, may be prevented.

In the vehicle lamp, a current to be applied to each of light emitting diodes is controlled such that a preset light distribution pattern is formed. This may allow an optical amount corresponding to each part of the light distribution pattern to be the same as a preset optical amount.

Further, since a plurality of electrode layers are provided to form unit surface light sources, a large surface light source may be implemented by assembling the unit surface light sources with each other. Further, as the electrode layer is divided into unit electrode layers, the vehicle lamp may have a long lifespan and may be easily repaired.

Further, in the present disclosure, a leakage current due to an inferior semiconductor light emitting diode may be prevented by the insulation layer having a planarized surface. As the planarized surface is used, processes to insulate upper and lower electrodes from each other may be simplified.

Figure 14:
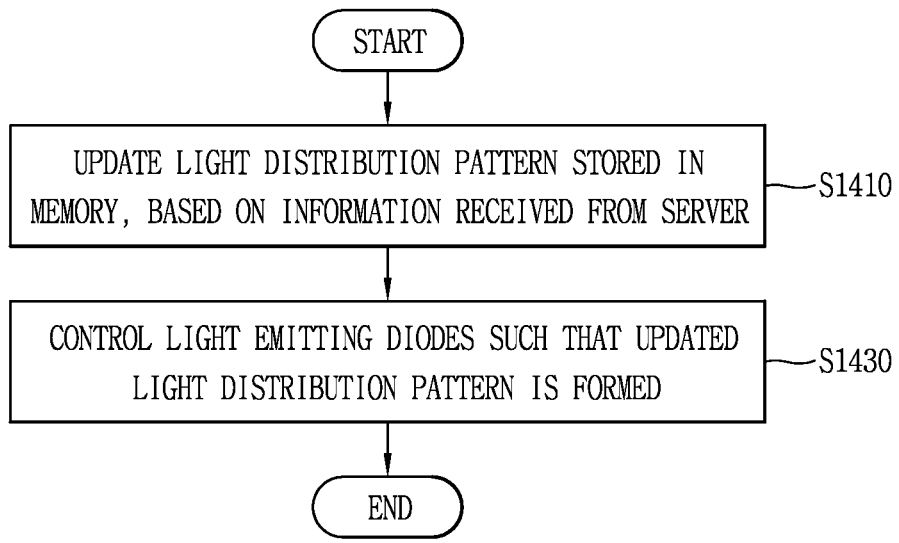
FIG. 14 is a flowchart illustrating an example of a vehicle lamp updating a light distribution pattern.

FIG. 14 is a flowchart illustrating an example of a vehicle lamp updating a light distribution pattern.

When information is received from a server, the vehicle lamp or the vehicle may update a light distribution pattern stored in the memory, based on the information received from the server (S1410).

For instance, information may be received from the server regarding a change in a light distribution pattern corresponding to a change in a requirement for the patterns (e.g., a change in a legal or regulatory standard for the vehicle lamp).

As another example, when the vehicle enters or is scheduled to enter a geographic region not included in a database, the vehicle or the vehicle lamp may request a light distribution pattern corresponding to the geographic region from the server. Then, the server may transmit the requested light distribution pattern corresponding to the geographic region to the vehicle or the vehicle lamp.

Then, the vehicle or the vehicle lamp may update the database stored in the memory, based on the received information.

The vehicle or the vehicle lamp may control light emitting diodes such that an updated light distribution pattern may be formed (S1430). Light emitting diodes to be turned on or off may be changed according to the updated light distribution pattern. This may allow a driver to be conveniently provided with a proper light distribution pattern.

Figure 15:
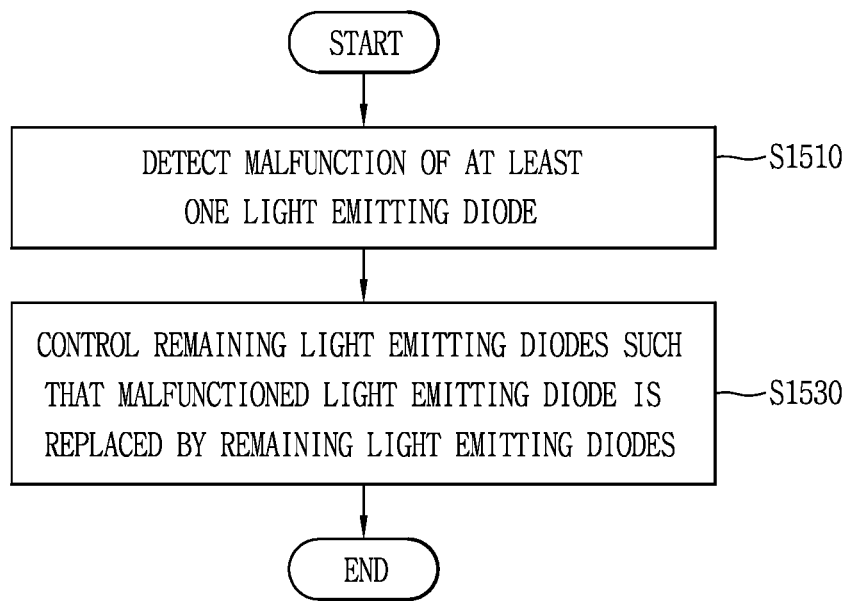
FIG. 15 is a flowchart illustrating an example of controlling a vehicle lamp in a state in which one or more light emitting diodes have malfunctioned.

FIG. 15 is a flowchart illustrating an example of controlling the vehicle lamp when one or more light emitting diodes malfunction.

The vehicle lamp may sense a malfunction of at least one light emitting diode (S1510). More specifically, the vehicle lamp may be provided with a sensor for detecting a malfunction of at least one light emitting diode, and may detect at least one malfunctioned light emitting diode based on information output from the sensor. The sensor may be a camera for capturing a light distribution pattern, for instance. In a case where a region of an image captured by the camera has a brightness lower than a reference value, the controller may determine that one or more light emitting diodes which form the region have a malfunction.

Next, the controller may control the remaining light emitting diodes to replace the malfunctioned light emitting diodes (S1530).

A displayable region is divided into a region where a light distribution pattern irradiated, and a region where the light distribution pattern is not irradiated. Light emitting diodes, which form the region where the light distribution pattern is not irradiated, maintain an off state, unless the light distribution pattern is changed. As the malfunctioned light emitting diodes are compensated for by the remaining light emitting diodes, the head lamp may still achieve a desired output light radiation (e.g., to satisfy a legal or regulatory standard).

The controller may change a direction that the remaining light emitting diodes face by using the driving unit provided at the vehicle lamp, such that the remaining light emitting diodes replace the malfunctioned light emitting diodes.

While the first lamp forms a first partial light distribution pattern and the second lamp forms a second partial light distribution pattern in a divided irradiation manner, one of the first and second lamps may malfunction.

In this case, the vehicle lamp may control another of the first and second lamps to generate an entire light distribution pattern in an overlapped irradiation manner. That is, even if one of the first and second lamps malfunctions, an entire light distribution pattern is generated by another of the first and second lamps. This may provide a view to a driver.

The vehicle having the vehicle lamp of the present disclosure may be provided with a display, and a user interface to change a light distribution pattern by using the display may be provided to a driver.

The display outputs (displays) information processed by the vehicle and/or the vehicle lamp. For instance, the display may output information about an execution screen of an application program driven by the vehicle, or user interface (UI) and graphic user interface (GUI) information according to the execution screen information.

The display may include a touch sensor configured to sense a touch input applied to the display, such that a control command may be input in a touch manner.

More specifically, the display may be provided with a touch sensor, and the display and the touch sensor may be operated in a cooperative manner under control of the controller. The display may form a touch screen together with the touch sensor. In this case, the touch screen may function as a user input unit.

Figure 16:
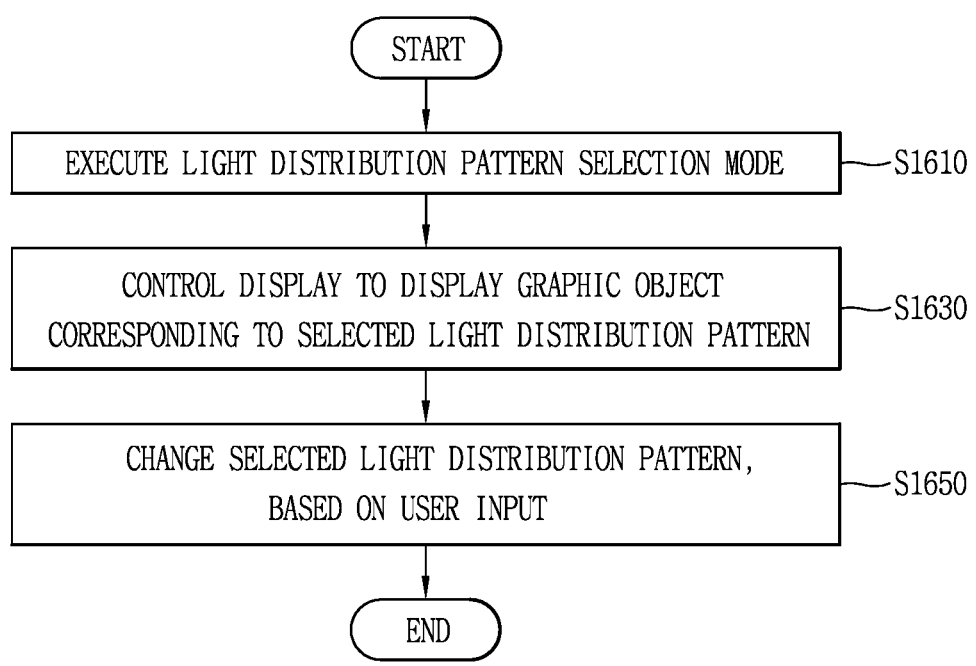
FIGS. 16 and 17 are diagrams illustrating examples of a vehicle lamp changing a light distribution pattern according to a user's input.
Figure 17:
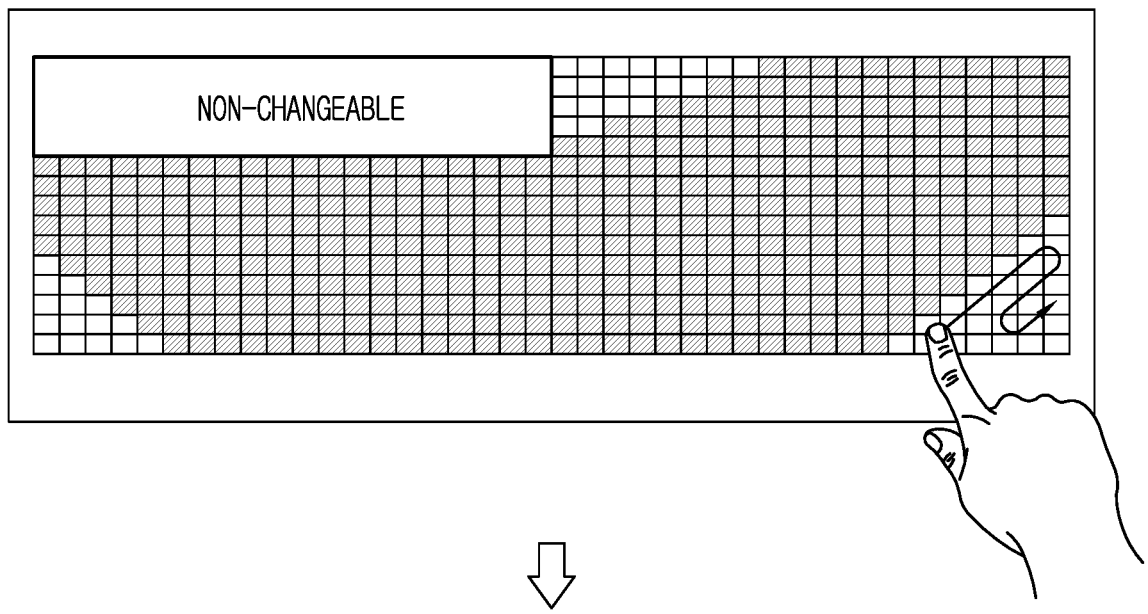
Figure 17:
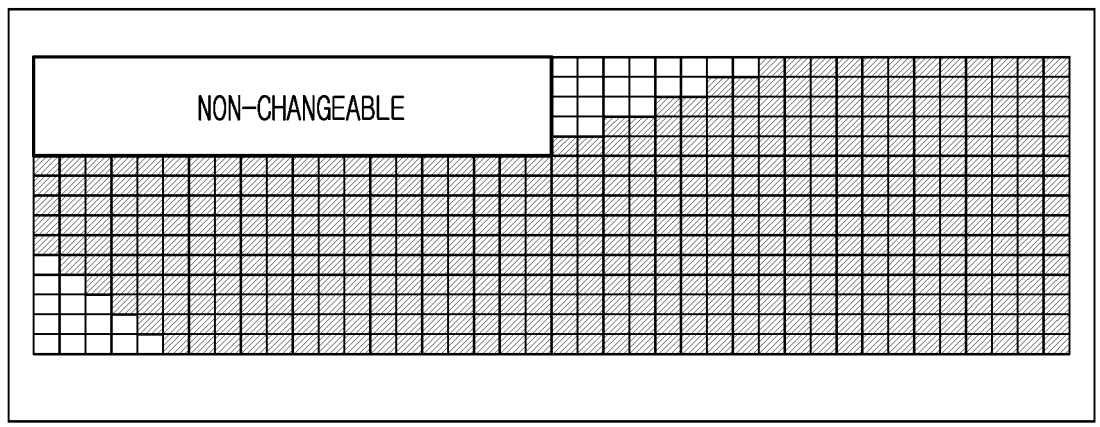

FIGS. 16 and 17 illustrate examples of a vehicle lamp changing a light distribution pattern according to a user's input.

Referring to FIG. 16, a light distribution pattern selection mode may be executed (S1610).

The light distribution pattern selection mode may be executed by a user input, or when at least one light emitting diode malfunctions, or when there occurs a driving situation where a light distribution pattern should be changed, or when the driving situation is expected to occur.

Once the light distribution pattern selection mode is executed, the vehicle controls the display to display a graphic object corresponding to a current light distribution pattern (S1630). The graphic object may indicate a shape of the selected light distribution pattern, a shape of a cut-off line, whether there exists a malfunctioned light emitting diode, etc.

Next, the vehicle may change the selected light distribution pattern based on a user input (S1650).

For instance, the display may display one or more changeable light distribution pattern candidates, and the selected light distribution pattern may be changed into another light distribution pattern based on a user input.

As another example, the display may display displayable regions in the form of matrices (or a table). In this case, pixels included in a light distribution pattern and pixels not included in the light distribution pattern may be distinguished from each other. That is, the pixels included in the light distribution pattern may be highlighted.

As shown in FIG. 17, when a touch input is applied to pixels not included in a light distribution pattern, the touched pixels may be added to the light distribution pattern. On the contrary, when a touch input is applied to pixels included in a light distribution pattern, the touched pixels may be excluded from the light distribution pattern. With such a configuration, a driver may generate a desired light distribution pattern.

If a light distribution pattern is changed, the vehicle lamp may control an on/off state of the light emitting diodes such that the changed light distribution pattern may be implemented.

Implementations of the present disclosure may be implemented as computer-readable codes in a program-recorded medium. The computer-readable medium may include various types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the vehicle or vehicle lamp. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle lamp, comprising:
at least one head lamp having a plurality of optical modules spaced apart from each other, each optical module comprising a base substrate and a plurality of light emitting diodes disposed on the base substrate; and
at least one processor configured to control the plurality of optical modules to form a light distribution pattern, wherein the light distribution pattern is formed at a distance from the vehicle lamp,
wherein the at least one processor is configured to:
control the plurality of light emitting diodes in each of the plurality of optical modules to form a respective part of the light distribution pattern; and
control the plurality of optical modules to form the light distribution pattern by controlling, among an aggregate group of light emitting diodes in the plurality of optical modules, a first group of light emitting diodes to form a first part of the light distribution pattern, and a second group of light emitting diodes to form a second part of the light distribution pattern,
wherein, based on the first and second group of light emitting diodes being switched on, the first and the second parts of the light distribution pattern are (i) separated in the light distribution pattern at the distance from the vehicle lamp and (ii) adjacent to each other, and
wherein the first group of light emitting diodes is implemented on a base substrate of a first optical module among the plurality of optical modules, and the second group of light emitting diodes is implemented on a base substrate of a second optical module among the plurality of optical modules.

2. The vehicle lamp of claim 1, wherein the at least one processor is configured to control the first group of light emitting diodes to output a first amount of optical output for the first part of the light distribution pattern to be different from a second amount of optical output for the second part of the light distribution pattern that is output by the second group of light emitting diodes.

3. The vehicle lamp of claim 1, wherein the at least one processor is configured to control a first amount of optical output for the first part of the light distribution pattern by differently controlling a brightness of light emitting diodes in the first group of light emitting diodes.

4. The vehicle lamp of claim 1, wherein the at least one processor is configured to control a first amount of optical output of the first part of the light distribution pattern by turning off at least one light emitting diode in the first group of light emitting diodes.

5. The vehicle lamp of claim 1, wherein the first part of the light distribution pattern formed by the first group of light emitting diodes is included in a low beam region, and the second part of the light distribution pattern formed by the second group of light emitting diodes is included in a high beam region.

6. The vehicle lamp of claim 1, wherein the at least one processor is configured to control the first group of light emitting diodes to form the first part of the light distribution pattern by:
controlling at least some light emitting diodes in the first group of light emitting diodes to have different angles between a respective direction and a reference direction.

7. The vehicle lamp of claim 6, further comprising a driving unit configured to change a direction of orientation for at least some light emitting diodes in the first group of light emitting diodes.

8. The vehicle lamp of claim 1, wherein the at least one processor is further configured to:
among the plurality of light emitting diodes in each of the plurality of optical modules, deactivate one or more light emitting diodes that do not form the respective part of the light distribution pattern.

9. The vehicle lamp of claim 8, wherein the at least one processor is configured to control the plurality of light emitting diodes in each of the plurality of optical modules to form the respective part of the light distribution pattern by:
controlling an on/off state of the plurality of light emitting diodes to form the respective part of the light distribution pattern; and
changing a set of light emitting diodes that are turned off according to a change in the light distribution pattern.

10. The vehicle lamp of claim 1, wherein the at least one processor is configured to control the at least one head lamp by controlling a left head lamp to form a first partial light distribution pattern, and controlling a right head lamp to form a second partial light distribution pattern, and
wherein the light distribution pattern comprises the first partial light distribution pattern and the second partial light distribution pattern.

11. The vehicle lamp of claim 10, wherein the at least one processor is configured to control the left head lamp and the right head lamp to output the first and second partial light distribution patterns to not overlap with each other.

12. The vehicle lamp of claim 11, wherein the at least one processor is configured to:
based on one of the right head lamp or the left head lamp being in a state of malfunction, control at least some of the optical modules included in the other of the right head lamp or the left head lamp to output an extended partial light distribution pattern.

13. The vehicle lamp of claim 10, wherein the at least one processor is configured to control the right head lamp and the left head lamp to output the first and second partial light distribution patterns to overlap with each other at least partially.

14. The vehicle lamp of claim 13, wherein the at least one processor is configured to control a first brightness of a first set of light emitting diodes that correspond to an overlapped portion between the first and second partial light distribution patterns to be different from a second brightness of a second set of light emitting diodes that correspond to a non-overlapped portion between the first and second partial light distribution patterns, and
    wherein the at least one processor is configured to control the first brightness and the second brightness such that an amount of optical output for the light distribution pattern that comprises the first and second partial light distribution patterns is maintained at a constant value.

15. The vehicle lamp of claim 11, wherein each optical module in the left head lamp forms a different respective part of the first partial light distribution pattern, and
    wherein each optical module included in the right head lamp forms a different respective part of the second partial light distribution pattern.

16. The vehicle lamp of claim 1, wherein each of the plurality of optical modules comprises an electrode layer that is disposed on the base substrate and that is electrically connected to the plurality of light emitting diodes, and
    wherein the electrode layer is provided with a common electrode surface with which each of the plurality of light emitting diodes is overlapped.

17. The vehicle lamp of claim 16, wherein the at least one processor is further configured to control a current applied to the plurality of light emitting diodes in each of the plurality of optical modules, such that the light distribution pattern is formed.

18. The vehicle lamp of claim 16, wherein at least part of the common electrode surface is configured to be bent.

* * * * *